(12) United States Patent
Wang

(10) Patent No.: US 12,225,234 B2
(45) Date of Patent: Feb. 11, 2025

(54) DPB SIZE BASED REFERENCE PICTURE ENTRY CONSTRAINTS

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/714,008

(22) Filed: Apr. 5, 2022

(65) Prior Publication Data

US 2022/0239934 A1 Jul. 28, 2022

Related U.S. Application Data

(63) Continuation of application No. PCT/US2020/054454, filed on Oct. 6, 2020.
(Continued)

(51) Int. Cl.
*H04N 19/00* (2014.01)
*H04N 19/105* (2014.01)
(Continued)

(52) U.S. Cl.
CPC .......... *H04N 19/70* (2014.11); *H04N 19/105* (2014.11); *H04N 19/136* (2014.11); *H04N 19/159* (2014.11); *H04N 19/172* (2014.11); *H04N 19/174* (2014.11); *H04N 19/187* (2014.11); *H04N 19/188* (2014.11);
(Continued)

(58) Field of Classification Search
CPC .... H04N 19/70; H04N 19/105; H04N 19/136; H04N 19/159; H04N 19/172; H04N 19/174; H04N 19/187; H04N 19/188; H04N 19/30; H04N 19/423; H04N 19/46; H04N 19/463; H04N 19/50; H04N 19/593

See application file for complete search history.

(56) References Cited

U.S. PATENT DOCUMENTS 8,693,549 B2 4/2014 Choi et al.
9,699,480 B2 7/2017 Deshpande
(Continued)

FOREIGN PATENT DOCUMENTS

CN 104641648 A 5/2015
CN 104662914 A 5/2015
(Continued)

OTHER PUBLICATIONS

Bross et al. "Versatile Video Coding (Draft 6)"; version 14, Jul. 31, 2019. (Year: 2019).*
(Continued)

*Primary Examiner* — Zhihan Zhou
(74) *Attorney, Agent, or Firm* — Conley Rose, P.C.

(57) ABSTRACT

A video coding mechanism is disclosed. The mechanism includes receiving a bitstream comprising a current picture and a reference picture list syntax structure (ref_pic_list_struct( )) comprising a number of reference entries (num_ref_entries) constrained to a range of zero to a maximum decoded picture buffer size plus an offset. The current picture is decoded based on the ref_pic_list_struct( ) to produce a decoded picture. The decoded picture is forwarded for display as part of a decoded video sequence.

16 Claims, 12 Drawing Sheets

Related U.S. Application Data

(60) Provisional application No. 62/911,808, filed on Oct. 7, 2019.

(51) Int. Cl.

| | | |
|---|---|---|
| *H04N 19/136* | (2014.01) | |
| *H04N 19/159* | (2014.01) | |
| *H04N 19/169* | (2014.01) | |
| *H04N 19/172* | (2014.01) | |
| *H04N 19/174* | (2014.01) | |
| *H04N 19/187* | (2014.01) | |
| *H04N 19/30* | (2014.01) | |
| *H04N 19/423* | (2014.01) | |
| *H04N 19/46* | (2014.01) | |
| *H04N 19/463* | (2014.01) | |
| *H04N 19/50* | (2014.01) | |
| *H04N 19/593* | (2014.01) | |
| *H04N 19/70* | (2014.01) | |

(52) U.S. Cl.
CPC .......... *H04N 19/30* (2014.11); *H04N 19/423* (2014.11); *H04N 19/46* (2014.11); *H04N 19/463* (2014.11); *H04N 19/50* (2014.11); *H04N 19/593* (2014.11)

(56) References Cited

U.S. PATENT DOCUMENTS

| | | |
|---|---|---|
| 9,712,871 B2 | 7/2017 | Ramasubramonian et al. |
| 9,819,948 B2 | 11/2017 | Wang |
| 9,918,091 B2 | 3/2018 | Wang et al. |
| 9,942,545 B2 | 4/2018 | Kwon et al. |
| 9,992,493 B2 | 6/2018 | Chen et al. |
| 10,404,990 B2 | 9/2019 | Hendry et al. |
| 10,432,951 B2 | 10/2019 | Wang |
| 2009/0010332 A1 | 1/2009 | Jeon et al. |
| 2012/0230431 A1 | 9/2012 | Boyce et al. |
| 2013/0077681 A1 | 3/2013 | Chen et al. |
| 2014/0003491 A1 | 1/2014 | Chen et al. |
| 2014/0086303 A1 | 3/2014 | Wang |
| 2014/0086331 A1 | 3/2014 | Wang |
| 2014/0086333 A1 | 3/2014 | Wang |
| 2014/0086336 A1 | 3/2014 | Wang |
| 2014/0092996 A1 | 4/2014 | Wang |
| 2014/0185691 A1 | 7/2014 | Kwon et al. |
| 2014/0218473 A1 | 8/2014 | Hannuksela et al. |
| 2014/0294062 A1 | 10/2014 | Chen et al. |
| 2014/0301441 A1 | 10/2014 | Wang et al. |
| 2014/0301477 A1 | 10/2014 | Deshpande |
| 2014/0301484 A1* | 10/2014 | Wang .................. H04N 19/91 375/240.26 |
| 2015/0016545 A1* | 1/2015 | Ramasubramonian et al. ............ H04N 19/423 375/240.25 |
| 2015/0103884 A1 | 4/2015 | Ramasubramonian et al. |
| 2015/0103886 A1 | 4/2015 | He et al. |
| 2015/0103928 A1 | 4/2015 | Seregin et al. |
| 2015/0189322 A1 | 7/2015 | He et al. |
| 2015/0264366 A1 | 9/2015 | Hendry et al. |
| 2015/0304666 A1 | 10/2015 | Seregin et al. |
| 2015/0319448 A1 | 11/2015 | Ramasubramonian et al. |
| 2015/0334407 A1 | 11/2015 | Rusert |
| 2015/0365702 A1 | 12/2015 | Deshpande |
| 2015/0373333 A1 | 12/2015 | Wang et al. |
| 2015/0373346 A1 | 12/2015 | Wang |
| 2015/0373361 A1 | 12/2015 | Wang et al. |
| 2016/0044324 A1 | 2/2016 | Deshpande |
| 2016/0119632 A1 | 4/2016 | Lee et al. |
| 2016/0173887 A1 | 6/2016 | Deshpande |
| 2016/0191926 A1 | 6/2016 | Deshpande et al. |
| 2016/0249056 A1 | 8/2016 | Tsukuba et al. |
| 2016/0255373 A1 | 9/2016 | Deshpande |
| 2016/0261878 A1 | 9/2016 | Deshpande |
| 2016/0301895 A1 | 10/2016 | Lu et al. |
| 2016/0366428 A1 | 12/2016 | Deshpande |
| 2017/0006300 A1 | 1/2017 | Tsukuba et al. |
| 2017/0019673 A1 | 1/2017 | Tsukuba et al. |
| 2017/0026655 A1 | 1/2017 | Deshpande |
| 2017/0134742 A1 | 5/2017 | Despande |
| 2018/0167637 A1 | 6/2018 | Yin et al. |
| 2019/0052910 A1 | 2/2019 | Deshpande |
| 2019/0058895 A1 | 2/2019 | Deshpande |
| 2021/0092426 A1 | 3/2021 | Choi et al. |
| 2021/0092451 A1 | 3/2021 | Choi et al. |
| 2022/0109848 A1 | 4/2022 | Wang |
| 2022/0109861 A1 | 4/2022 | Hannuksela et al. |
| 2022/0109865 A1 | 4/2022 | Deshpande |
| 2022/0232256 A1 | 7/2022 | Wang |
| 2022/0345745 A1* | 10/2022 | Deshpande ............ H04N 19/70 |
| 2023/0085717 A1 | 3/2023 | Wang |
| 2023/0156230 A1 | 5/2023 | Hendry |

FOREIGN PATENT DOCUMENTS

| | | |
|---|---|---|
| CN | 105075262 A | 11/2015 |
| CN | 105519119 A | 4/2016 |
| CN | 105556975 A | 5/2016 |
| CN | 105637878 A | 6/2016 |
| CN | 105637883 A | 6/2016 |
| CN | 105706451 A | 6/2016 |
| CN | 106105217 A | 11/2016 |
| CN | 107852511 A | 3/2018 |
| JP | 2015529439 A | 10/2015 |
| JP | 2015195543 A | 11/2015 |
| JP | 2016518759 A | 6/2016 |
| JP | 2016518763 A | 6/2016 |
| JP | 2016528806 A | 9/2016 |
| JP | 2016530734 A | 9/2016 |
| JP | 2016539545 A | 12/2016 |
| JP | 2017522792 A | 8/2017 |
| JP | 2017523683 A | 8/2017 |
| RU | 2612577 C2 | 3/2017 |
| RU | 2649297 C2 | 3/2018 |
| RU | 2653299 C2 | 5/2018 |
| RU | 2656827 C2 | 6/2018 |
| WO | 2013162450 A1 | 10/2013 |
| WO | 2014047613 A1 | 3/2014 |
| WO | 2015053330 A1 | 4/2015 |
| WO | 2015196034 A1 | 12/2015 |
| WO | 2021057869 A1 | 4/2021 |

OTHER PUBLICATIONS

Document: JVET-P0117-v1, Wang, Y., "AHG8: Scalability—PTL and decoder capability," Joint Video Experts Team (JVET) of ITU-Y SG 16 WP 3 and ISO/IEC JTC 1/SC 29/WG 11 16th Meeting: Geneva, CH, Oct. 1-11, 2019, 7 pages.

Document: JVET-P0118-version 3 Wang, Y., "AHG8: Scalability—HRD," JVET-P0118-v3_SpecText.docx, Oct. 1, 2019, pp. 49, 57, 120, 134-135, 160-162.

Document: JVET-O2001-vE, Bross, B., et al., "Versatile Video Coding (Draft 6)" Joint Video Experts Team (JVET) of ITU-Y SG 16 WP 3 and ISO/IEC JTC 1/SC 29/WG 11 15th Meeting: Gothenburg, SE, Jul. 3-12, 2019, pp. 4-6, 85-87.

Document: JVET-O0148-v1, Wang, Y., et al., "AHG17: On reference picture list signalling," Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-6.

Document: JVET-P0205, Drugeon, V., et al., "AHG17: Presence of Video Parameter Set in bitstreams," Joint Video Experts Team (JVET) of ITU-Y SG 16 WP 3 and ISO/IEC JTC 1/SC 29/WG 11 16th Meeting: Geneva, CH, Oct. 1-11, 2019, 7 pages.

Document: JVET-P0125-v1, Wang, Y., "AHG8/AHG17: Miscellaneous HLS topics," Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.

Document: JCTVC-M0209, WG 11 No. m28663, Deshpande, S., "On Design for Signaling Inter-layer Prediction," Joint Collabora-

(56) References Cited

OTHER PUBLICATIONS tive Team on Video Coding (JCT-VC) of ITU-T SG16 WP3 and ISO/IEC JTC1/ SC29/ WG11, 13th Meeting: Incheon, KR, Apr. 18-26, 2013, 6 pages, XP030114166.

Document: JVET-R2001-vA, Bross, B., et al., "Versatile Video Coding (Draft 9)," Joint Video Experts Team (JVET) of ITU-T SG 16 WP 3 and ISO/IEC JTC I/SC 29/WG 11, 18th Meeting: by teleconference, Apr. 15-24, 2020, 526 pages, XP030288322.

Document: JCTVC-Q0154, Ramasubramonian, A., et al., "MV-HEVC/SHVC HLS: On picture flushing and DPB parameters," Joint Collaborative Team on Video Coding (JCT-VC) of ITU-T SG 16 WP 3 and ISO/IEC JTC 1/SC 29/WG11, 17th Meeting: Valencia, ES, Mar. 27-Apr. 4, 2014, 13 pages, XP030132094.

Document: JVET-R0193-r1, Hendry et al., "AHG8/AHG9: On signalling of syntax element max_tid_il_ref_pics_plusl," Joint Video Experts Team (JVET) of ITU-T SG 16 WP 3 and ISO/IEC JTC 1/SC 29/WG11, 18th Meeting: by teleconference, Apr. 15-24, 2020, 6 pages, XP030286144.

Document: JVET-P0097, Hannuksela, M, "AHG8/AHG17: Removing dependencies on VPS from the decoding process of a non-scalable bitstream," Joint Video Experts Team (JVET) of ITU-T SG 16 WP 3 and ISO/IEC JTC 1/SC 29/WG11, 16th Meeting: Geneva, CH, Oct. 1-11, 2019, 5 pages, XP030205943.

Dong, L., et al., "Implementation of HEVC Network Abstraction Layer Unit Based on FPGA," Electrical Switches (2019. No. 2), 2019, with an English Abstract, 4 pages.

Yan, Z., et al., "Flexible prediction structure for multi-view video coding," Journal of Image and Graphics, vol. 17, No. 6, Jun. 2012, with an English Abstract, 6 pages.

Xu, T., et al., "A video stitching method based on compressed domain," Video engineering, 2017, 41(11/12), with an English Abstract, 6 pages.

Document: JVET-P0117-v2, Wang, Y., "AHG8: Scalability—PTL and decoder capability," Joint Video Experts Team (JVET) of ITU-T SG 16 WP 3 and ISO/IEC JTC 1/SC 29/WG11, 16th Meeting: Geneva, CH, Oct. 1-11, 2019, 4 pages, XP030216291.

Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, 495 pages.

Document: JVET-O2001-vE, Bross, B., et al., "Versatile Video Coding (Draft 6)," Joint Video Experts Team (JVET) of ITU-T SG 16 WP 3 and IS0/IEC JTC 1/SC 29/WG 11, 15th Meeting: Gothenburg, SE, Jul. 3-12, 2019, 455 pages, XP030208568.

Document: JVET-Q0197-v1, Wang, B., et al., "Miscellaneous fixes for HLS in Specification," Joint Video Experts Team (JVET) of ITU-T SG 16 WP 3 and 1S0/IEC JTC 1/SC 29/WG11, 17th Meeting: Brussels, BE, Jan. 7-17, 2020, 2 pages, XP030222871.

Document: JVET-P0115-v1, Wang, Y., "AHG8: Scalability—output layer sets," Joint Video Experts Team (JVET) of ITU-T SG 16 WP 3 and ISO/IEC JTC 1/SC 29/WG 11, 16th Meeting: Geneva, CH, Oct. 1-11, 2019, 5 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG11, 16th Meeting: Geneva, CH, Oct. 1-11, 2019, 491 pages, XP030218455.

Document: JCTVC-M0450_v3, Wang, Y., "Report of the joint BoG on high-level syntax," Joint Collaborative Team on Video Coding (JCT-VC) of ITU-T SG 16 WP 3 and ISO/IECJTC 1/SC 29/WG11, 13th Meeting: Incheon, KR, Apr. 18-26, 2013, 27 pages, XP030237563.

"Line Transmission of Non-Telephone Signals Video Codec for Audiovisual Services At px64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Bross, B., et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.

Wang, Y.K., "AHG8: Scalability—output layer sets," Document: JVET-P0115-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Wang, Y.K., "AHG8: Scalability—random access," Document: JVET-P0116-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Wang, Y.K., "AHGB: Scalability—PTL and decoder capability," Document: JVET-P0117-v1, Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

Wang, Y.K., "AHG8: Scalability—HRD," Document: JVET-P0118-v3, Joint Video Experts Team (JVET) of ITU-T SG 16 WP 3 and ISO/IEC JTC 1/SC 29/WG 11 16th Meeting: Geneva, CH, Oct. 1-11, 2019, 3 pages.

Wang, Y.K., "AHG8/AHG17: Miscellaneous HLS topics," Document: JVET-P0125-v1, Joint Video Experts Team (JVET) of ITU-T SG 16 WP 3 and ISO/IEC JTC 1/SC 29/WG 11 16th Meeting: Geneva, CH, Oct. 1-11, 2019, 3 pages.

Wang, Y.K., "AHG8/AHG17: On buffering period, picture timing, and decoding unit information SEI messages," Document: JVET-P0189-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Wang, Y.K., "AHG8/AHG17: Scalable nesting SEI message," Document: JVET-P0190-v1, Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

Sjoberg, R., et al., "Overview of HEVC High-Level Syntax and Reference Picture Management," IEEE Transactions on Circuits and Systems for Video Technology, vol. 22, No. 12, Dec. 2012, 13 pages.

Document: JVET-P0185-v1, Deshpande, S., "On Video Parameter Set and Highest Temporal Sub-layer," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

Document: JCTVC-O0260, Misra, K., et al., "Inter Predictions Signalling and Picture Marking," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, 5 pages.

Document: JVET-S0152-v6, Wang, Y.K., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

Document: JVET-N1001-v10, B. Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, 407 pages.

Document: JVET-P0274WD, Tsui-Shan Chang, et al., "Non-CE1:WD of enabling TMVP in RPR," Joint Video Experts Team (JVET) of ITU-T SG 16 WP 3 and ISO/IEC JTC 1/SC 29/WG 11, 16th Meeting: Geneva, CH, Jul. 3-12, 2019, 445 pages.

Document: JVET-O0228, Virginie Drugeon: "AHG17: Harmonized HRD parameters signaling," Joint Video Experts Team (JVET) of

(56) References Cited

OTHER PUBLICATIONS

ITU-T SG 16 WP 3 and ISO/IEC JTC 1/SC 29/WG11, 15th Meeting: Gothenburg, SE, Jul. 3-12, 2019, 5 pages.
Document: JVET-P0589, Vadim Seregin:"AHG8: On inter-layer reference picture index range." Joint Video Experts Team (JVET) of ITU-T SG 16 WP 3 and ISO/IEC JTC 1/SC 29/WG 11, 16th Meeting: Geneva, CH, Oct. 1-11, 2019, 2 pages.
Document: JVET-Q0118-v1, Ye-Kui Want:"AHG8/AHG9: Scalability HLS cleanups." Joint Video Experts Team (JVET) of ITU-T SG 16 WP 3 and ISO/IEC JTC 1/SC JTC 1/SC 29/WG 11, 17th Meeting: Brussels, BE, Jan. 7-17, 2020, 8 pages.
Document JVET-P02221-v2, B. Choi et al., "AHG8: On signaling interlayer reference picture list," Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.

\* cited by examiner

1100

```
┌─────────────────────────────────────────────────────────────┐
│ Receive a bitstream comprising a current picture and a      │
│ ref_pic_list_struct() comprising a num_ref_entries          │── 1101
│ constrained to a range of zero to a maximum decoded         │
│ picture buffer size plus an offset. The bitstream further   │
│ comprises dpb_parameters() comprising a                     │
│ maximum_dec_pic_buffering_minus1.                           │
└─────────────────────────────────────────────────────────────┘
                              │
                              ▼
┌─────────────────────────────────────────────────────────────┐
│ Decode the current picture based on the ref_pic_list_struct()│── 1103
│ and/or the dpb_parameters() to produce a decoded picture.   │
└─────────────────────────────────────────────────────────────┘
                              │
                              ▼
┌─────────────────────────────────────────────────────────────┐
│ Forward the decoded picture for display as part of a        │── 1105
│ decoded video sequence.                                     │
└─────────────────────────────────────────────────────────────┘
```

FIG. 11

DPB SIZE BASED REFERENCE PICTURE ENTRY CONSTRAINTS

CROSS-REFERENCE TO RELATED APPLICATIONS

This patent application is a continuation of International Application No. PCT/US2020/054454 filed on Oct. 6, 2020, by Futurewei Technologies, Inc., and titled "DPB Size Based Reference Picture Entry Constraints," which claims the benefit of U.S. Provisional Patent Application No. 62/911,808 filed Oct. 7, 2019 by Futurewei Technologies, Inc., and titled "Scalability In Video Coding," each of which is hereby incorporated by reference.

TECHNICAL FIELD

The present disclosure is generally related to video coding, and is specifically related to mechanisms for preventing errors when sub-bitstream extraction is performed on a multi-layer bitstream.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by the decoder, a bitstream comprising a current picture and a reference picture list syntax structure (ref_pic_list_struct( )) comprising a number of reference entries (num_ref_entries) constrained to a range of zero to a maximum decoded picture buffer size plus an offset; decoding, by the decoder, the current picture based on the ref_pic_list_struct( ) to produce a decoded picture.

A picture may be coded according to intra-prediction, inter-prediction, and/or inter-layer prediction. In intra-prediction, blocks in a picture are coded by reference to other blocks in the same picture. In inter-prediction, blocks in a current picture are coded by reference to blocks in one or more other pictures. In inter-layer prediction, pictures are coded into layers, and blocks of pictures in an output layer are coded by reference to blocks of pictures in reference layer(s). A ref_pic_list_struct( ) may be employed to keep track of the references between pictures to support reconstruction of inter-predicted pictures. In some video coding systems, the ref_pic_list_struct( ) includes a maximum number of reference entries that can be employed for a current picture. In such systems, the maximum number of reference entries for a current picture is a statically defined value that is global to all layers. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources. The present example includes a mechanism for constraining the ref_pic_list_struct( ) to support different picture buffer usage for different types of layers. For example, a num_ref_entries syntax element can be included in the ref_pic_list_struct( ). The num_ref_entries indicates the number of entries used for each picture. The num_ref_entries can be constrained to maintain a range that is selected based on a maximum decoded picture buffer size. The maximum decoded picture buffer size varies depending on whether a layer is a reference layer or an output layer. Accordingly, constraining the num_ref_entries based on the maximum decoded picture buffer size allows different numbers of reference pictures to be employed for output layers and reference layers. Further, a set of reference pictures (setofRefPics) for each picture can be constrained by the maximum decoded picture buffer size that varies based on layer instead of a static value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

Optionally, in any of the preceding aspects, another implementation of the aspect provides, wherein the ref_pic_list_struct( ) is referenced according to a list index (listIdx) and a reference picture list structure index (rplsIdx), denoted as ref_pic_list_struct(listIdx, rplsIdx), wherein the num_ref_entries is denoted num_ref_entries [listIdx][rplsIdx], and wherein the num_ref_entries [listIdx][rplsIdx] specifies a number of entries in the ref_pic_list_struct(listIdx, rplsIdx).

Optionally, in any of the preceding aspects, another implementation of the aspect provides, wherein a number of pictures in a setOfRefPics referred to in the ref_pic_list_struct is constrained to be less than or equal to the maximum decoded picture buffer size minus one.

Optionally, in any of the preceding aspects, another implementation of the aspect provides, wherein the ref_pic_list_struct( ) includes a reference picture list zero (RefPicList[0]) and a reference picture list one (RefPicList[1]), and wherein the setOfRefPics is a set unique pictures referred to by all entries in RefPicList[0] that have a same network abstraction layer (NAL) unit header layer identifier (nuh_layer_id) as the current picture and all entries of in RefPicList[1] that have the same nuh_layer_id as the current picture.

Optionally, in any of the preceding aspects, another implementation of the aspect provides, wherein the setOfRefPics is a same set for all slices of each picture.

Optionally, in any of the preceding aspects, another implementation of the aspect provides, wherein the bitstream includes a decoded picture buffer parameter syntax structure (dpb_parameters( )), wherein the dpb_parameters( ) comprises a maximum decoded picture buffer minus one (max_dec_pic_buffering_minus1), and wherein the maximum decoded picture buffer size corresponds to the max_decpic_buffering_minus1.

Optionally, in any of the preceding aspects, another implementation of the aspect provides, wherein the dpb_parameters( ) are included in a video parameter set (VPS) or a sequence parameter set (SPS).

In an embodiment, the disclosure includes a method implemented by an encoder, the method comprising: encoding into a bitstream, by the encoder, a current picture based on a reference picture; encoding into the bitstream, by the encoder, a ref_pic_list_struct( ) indicating the reference picture and comprising a num_ref_entries constrained to a range of zero to a maximum decoded picture buffer size plus an offset; and storing, by the encoder, the bitstream for communication toward a decoder.

A picture may be coded according to intra-prediction, inter-prediction, and/or inter-layer prediction. In intra-prediction, blocks in a picture are coded by reference to other blocks in the same picture. In inter-prediction, blocks in a current picture are coded by reference to blocks in one or more other pictures. In inter-layer prediction, pictures are coded into layers, and blocks of pictures in an output layer are coded by reference to blocks of pictures in reference layer(s). A ref_pic_list_struct( ) may be employed to keep track of the references between pictures to support reconstruction of inter-predicted pictures. In some video coding systems, the ref_pic_list_struct( ) includes a maximum number of reference entries that can be employed for a current picture. In such systems, the maximum number of reference entries for a current picture is a statically defined value that is global to all layers. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources. The present example includes a mechanism for constraining the ref_pic_list_struct( ) to support different picture buffer usage for different types of layers. For example, a num_ref_entries syntax element can be included in the ref_pic_list_struct( ). The num_ref_entries indicates the number of entries used for each picture. The num_ref_entries can be constrained to maintain a range that is selected based on a maximum decoded picture buffer size. The maximum decoded picture buffer size varies depending on whether a layer is a reference layer or an output layer. Accordingly, constraining the num_ref_entries based on the maximum decoded picture buffer size allows different numbers of reference pictures to be employed for output layers and reference layers. Further, a setofRefPics for each picture can be constrained by the maximum decoded picture buffer size that varies based on layer instead of a static value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

Optionally, in any of the preceding aspects, another implementation of the aspect provides, wherein the ref_pic_list_struct( ) is referenced according to a listIdx and a rplsIdx, denoted as ref_pic_list_struct(listIdx, rplsIdx), wherein the num_ref_entries is denoted num_ref_entries [listIdx][rplsIdx], and wherein the num_ref_entries [listIdx][rplsIdx] specifies a number of entries in the ref_pic_list_struct(listIdx, rplsIdx).

Optionally, in any of the preceding aspects, another implementation of the aspect provides, wherein a number of pictures in a setOfRefPics referred to in the ref_pic_list_struct is constrained to be less than or equal to the maximum decoded picture buffer size minus one.

Optionally, in any of the preceding aspects, another implementation of the aspect provides, wherein the ref_pic_list_struct( ) includes a RefPicList[0] and a RefPicList[1], and wherein the setOfRefPics is a set unique pictures referred to by all entries in RefPicList[0] that have a same nuh_layer_id as the current picture and all entries of in RefPicList[1] that have the same nuh_layer_id as the current picture Optionally, in any of the preceding aspects, another implementation of the aspect provides, wherein the setOfRefPics is a same set for all slices of each picture.

Optionally, in any of the preceding aspects, another implementation of the aspect provides, wherein the bitstream includes a dpb_parameters( ), wherein the dpb_parameters( ) comprises a max_dec_pic_buffering_minus1, and wherein the maximum decoded picture buffer size corresponds to the max_dec_pic_buffering_minus1.

Optionally, in any of the preceding aspects, another implementation of the aspect provides, wherein the dpb_parameters( ) are included in a VPS or a SPS.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a current picture and a ref_pic_list_struct( ) comprising a num_ref_entries constrained to a range of zero to a maximum decoded picture buffer size plus an offset; a decoding means for decoding the current picture based on the ref_pic_list_struct( ) to produce a decoded picture; and a forwarding means for forwarding the decoded picture for display as part of a decoded video sequence.

A picture may be coded according to intra-prediction, inter-prediction, and/or inter-layer prediction. In intra-prediction, blocks in a picture are coded by reference to other blocks in the same picture. In inter-prediction, blocks in a current picture are coded by reference to blocks in one or more other pictures. In inter-layer prediction, pictures are coded into layers, and blocks of pictures in an output layer are coded by reference to blocks of pictures in reference layer(s). A ref_pic_list_struct( ) may be employed to keep track of the references between pictures to support reconstruction of inter-predicted pictures. In some video coding systems, the ref_pic_list_struct( ) includes a maximum number of reference entries that can be employed for a current picture. In such systems, the maximum number of reference entries for a current picture is a statically defined value that is global to all layers. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources. The present example includes a mechanism for constraining the refpic_list_struct( ) to support different picture buffer usage for different types of layers. For example, a num_ref_entries syntax element can be included in the ref_pic_list_struct( ). The num_ref_entries indicates the number of entries used for each picture. The num_ref_entries can be constrained to maintain a range that is selected based on a maximum decoded picture buffer size. The maximum decoded picture buffer size varies depending on whether a layer is a reference layer or an output layer. Accordingly, constraining the num_ref_entries based on the maximum decoded picture buffer size allows different numbers of reference pictures to be employed for output layers and reference layers. Further, a setofRefPics for each picture can be constrained by the maximum decoded picture buffer size that varies based on layer instead of a static value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding into a bitstream a current picture based on a reference picture; and encoding into the bitstream a ref_pic_list_struct( ) indicating the reference picture and comprising a num_re_entries constrained to a range of zero to a maximum decoded picture buffer size plus an offset; and a storing means for storing the bitstream for communication toward a decoder.

A picture may be coded according to intra-prediction, inter-prediction, and/or inter-layer prediction. In intra-prediction, blocks in a picture are coded by reference to other blocks in the same picture. In inter-prediction, blocks in a current picture are coded by reference to blocks in one or more other pictures. In inter-layer prediction, pictures are coded into layers, and blocks of pictures in an output layer are coded by reference to blocks of pictures in reference layer(s). A ref_pic_list_struct( ) may be employed to keep track of the references between pictures to support reconstruction of inter-predicted pictures. In some video coding systems, the ref_pic_iist_struct( ) includes a maximum number of reference entries that can be employed for a current picture. In such systems, the maximum number of reference entries for a current picture is a statically defined value that is global to all layers. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources. The present example includes a mechanism for constraining the ref_pic_list_struct( ) to support different picture buffer usage for different types of layers. For example, a num_ref_entries syntax element can be included in the ref_pic_list_struct( ). The num_ref_entries indicates the number of entries used for each picture. The num_ref_entries can be constrained to maintain a range that is selected based on a maximum decoded picture buffer size. The maximum decoded picture buffer size varies depending on whether a layer is a reference layer or an output layer. Accordingly, constraining the num_ref_entries based on the maximum decoded picture buffer size allows different numbers of reference pictures to be employed for output layers and reference layers. Further, a setofRefPics for each picture can be constrained by the maximum decoded picture buffer size that varies based on layer instead of a static value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

Optionally, in any of the preceding aspects, another implementation of the aspect provides, wherein the encoder is further configured to perform the method of any of the preceding aspects.

Optionally, in any of the preceding aspects, another implementation of the aspect provides, that the reference picture list syntax structure (ref_pic_list_struct( ) is present in a sequence parameter set (SPS), a picture header (PH) syntax structure, or a slice header.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 is a flowchart of an example method of decoding a video sequence from a bitstream based on a reference picture list structure with a number of reference entries constrained according to a maximum decoded picture buffer size.

DETAILED DESCRIPTION

Figure 1:
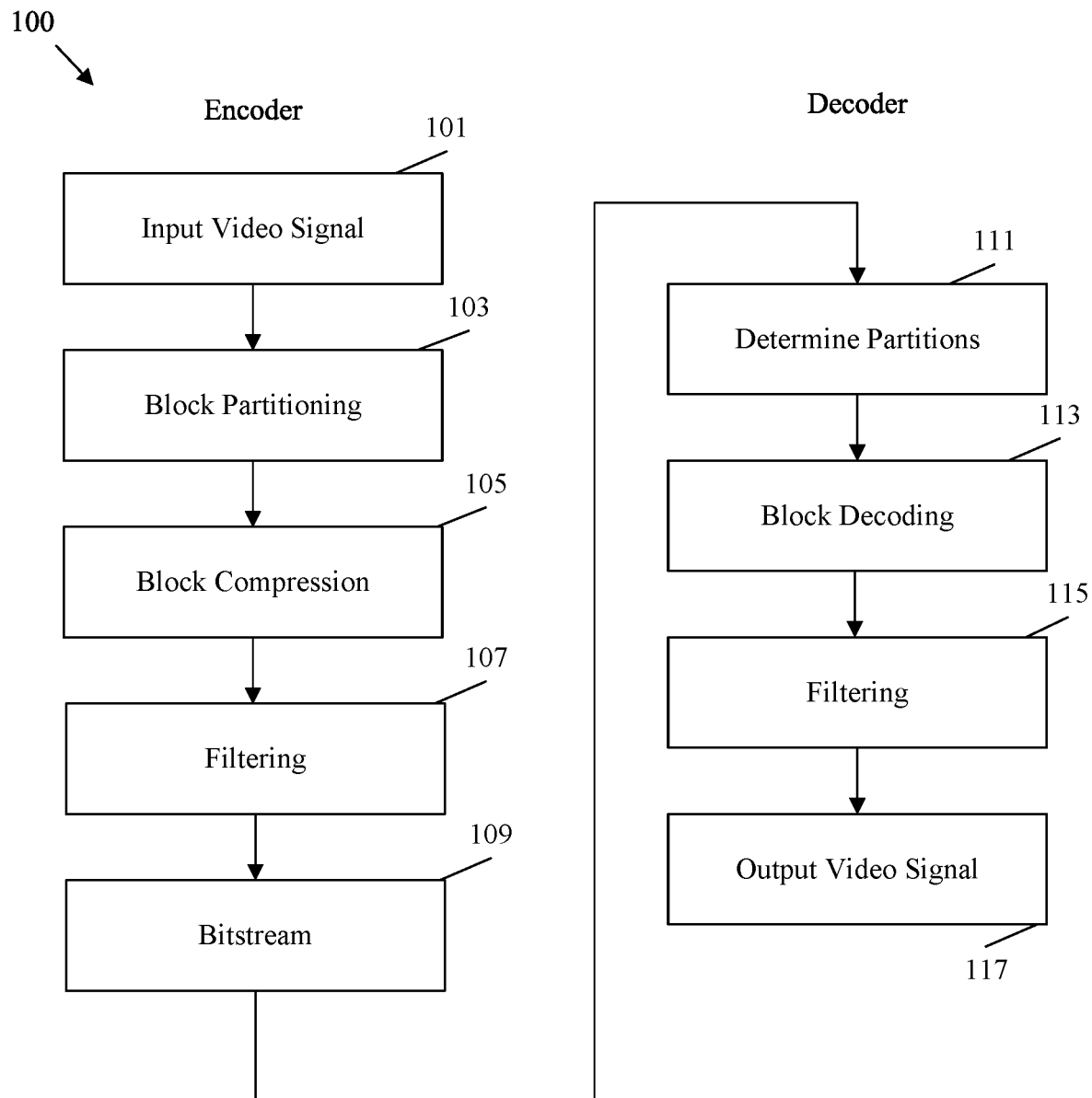
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A coded picture is a coded representation of a picture comprising video coding layer (VCL) network abstraction layer (NAL) units with a particular value of NAL unit header layer identifier (nuh_layer_id) within an access unit (AU) and containing all coding tree units (CTUs) of the picture. A decoded picture is a picture produced by applying a decoding process to a coded picture. A slice is an integer number of complete tiles or an integer number of consecutive complete coding tree unit (CTU) rows (e.g., within a tile) of a picture that are exclusively contained in a single NAL unit (a VCL NAL unit). A NAL unit is a syntax structure containing data in the form of a Raw Byte Sequence Payload (RBSP), an indication of the type of data, and interspersed as desired with emulation prevention bytes. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A layer is a set of VCL NAL units that share a specified characteristic (e.g., a common resolution, frame rate, image size, etc.) as indicated by layer Id (identifier) and associated non-VCL NAL units. A NAL unit header layer identifier (nuh_layer_id) is a syntax element that specifies an identifier of a layer that includes a NAL unit.

A hypothetical reference decoder (HRD) is a decoder model operating on an encoder that checks the variability of bitstreams produced by an encoding process to verify conformance with specified constraints. A bitstream conformance test is a test to determine whether an encoded bitstream complies with a standard, such as Versatile Video Coding (VVC). A video parameter set (VPS) is a syntax structure that contains parameters related to an entire video. A sequence parameter set (SPS) is a syntax structure containing syntax elements that apply to zero or more entire coded layer video sequences (CLVSs). A CLVS is a sequence of coded pictures with the same nuh_layer_id value. A reference picture may be defined as a picture that is a short-term reference picture, a long-term reference picture, or an inter-layer reference picture. For example, a reference picture may be any picture that contains blocks and/or samples used to code blocks and/or samples of another picture by reference according to inter-prediction. A reference picture list zero (RefPicList[0]) is a reference picture list used for inter-prediction (e.g., containing a list of corresponding reference pictures) of a unidirectional prediction (P) slice or the first of two reference picture lists used for inter-prediction of a bidirectional prediction (B) slice. A reference picture list one (RefPicList[1]) is a second reference picture list used for inter-prediction of a B slice (e.g., in conjunction with RefPicList[0]). A reference picture list syntax structure (ref_pic_list_struct( )) is a syntax structure containing RefPicList[0] and RefPicList[1]. A reference entry is an entry in a reference picture list that indicates a corresponding reference picture based on a reference index. A list index (listIdx) is an index that indicates a corresponding reference picture list, such as RefPicList[0] and/or RefPicList[1]. A reference picture list structure index (rplsIdx) is an index that indicates a reference entry in a corresponding reference picture list. A number of reference entries (num_ref_entries) is a syntax element that indicates the number of reference entries in a ref_pic_list_struct( ). A set of reference pictures (setOfRefPics) is a set of unique pictures referred to by all entries in RefPicList[0] and/or RefPicList[1] that have the same nuh_layer_id value as the current picture. A decoded picture buffer (DPB) is a buffer configured to hold decoded pictures for reference, output reordering, or output delay, for example at a decoder and/or HRD. A decoded picture buffer parameter syntax structure (dpb_parameters( )) a syntax structure that provides information regarding DPB size, maximum picture reorder number, and maximum latency for one or more output layer sets (OLSs). A maximum decoded picture buffer size is a derived variable that specifies a maximum required size of the DPB in units of picture storage buffers. A maximum decoded picture buffer minus one (max_dec_pic_buffering_minus1) is a syntax element that specifies a maximum required size of the DPB in units of picture storage buffers. An access unit (AU) is a set of coded pictures in different layers that are all associated with the same output time. A coded video sequence is a set of one or more coded pictures. A decoded video sequence is a set of one or more decoded pictures.

The following acronyms are used herein, Access Unit (AU), Coding Tree Block (CTB), Coding Tree Unit (CTU), Coding Unit (CU), Coded Layer Video Sequence (CLVS), Coded Layer Video Sequence Start (CLVSS), Coded Video Sequence (CVS), Coded Video Sequence Start (CVSS), Joint Video Experts Team (JVET), Hypothetical Reference Decoder (HRD), Motion Constrained Tile Set (MCTS), Maximum Transfer Unit (MTU), Network Abstraction Layer (NAL), Output Layer Set (OLS), Operation Point (OP), Picture Order Count (POC), Random Access Point (RAP), Raw Byte Sequence Payload (RBSP), Sequence Parameter Set (SPS), Video Parameter Set (VPS), Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-O2001-v14.

A picture may be coded according to intra-prediction, inter-prediction, and/or inter-layer prediction. In intra-prediction, blocks in a picture are coded by reference to other blocks in the same picture. In inter-prediction, blocks in a current picture are coded by reference to blocks in one or more other pictures. In inter-layer prediction, pictures are coded into layers, and blocks of pictures in an output layer are coded by reference to blocks of pictures in reference layer(s). A reference picture list syntax structure (ref_pic_list_struct( )) may be employed to keep track of the references between pictures to support reconstruction of inter-predicted pictures. In some video coding systems, the ref_pic_list_struct( ) includes a maximum number of reference entries that can be employed for a current picture. In such systems, the maximum number of reference entries for a current picture is a statically defined value that is global to all layers. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources.

Disclosed herein is a mechanism for constraining the ref_pic_list_struct( ) to support different picture buffer usage for different types of layers. For example, a number of reference entries (num_ref_entries) syntax element can be included in the ref_pic_list_struct( ). The num_ref_entries indicates the number of entries used for each picture. The num_ref_entries can be constrained to maintain a range that is selected based on a maximum decoded picture buffer size. The maximum decoded picture buffer size varies depending on whether a layer is a reference layer or an output layer.

Accordingly, constraining the num_ref_entries based on the maximum decoded picture buffer size allows different numbers of reference pictures to be employed for output layers and reference layers. Further, a set of reference pictures (setofRefPics) for each picture can be constrained by the maximum decoded picture buffer size that varies based on layer instead of a static value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
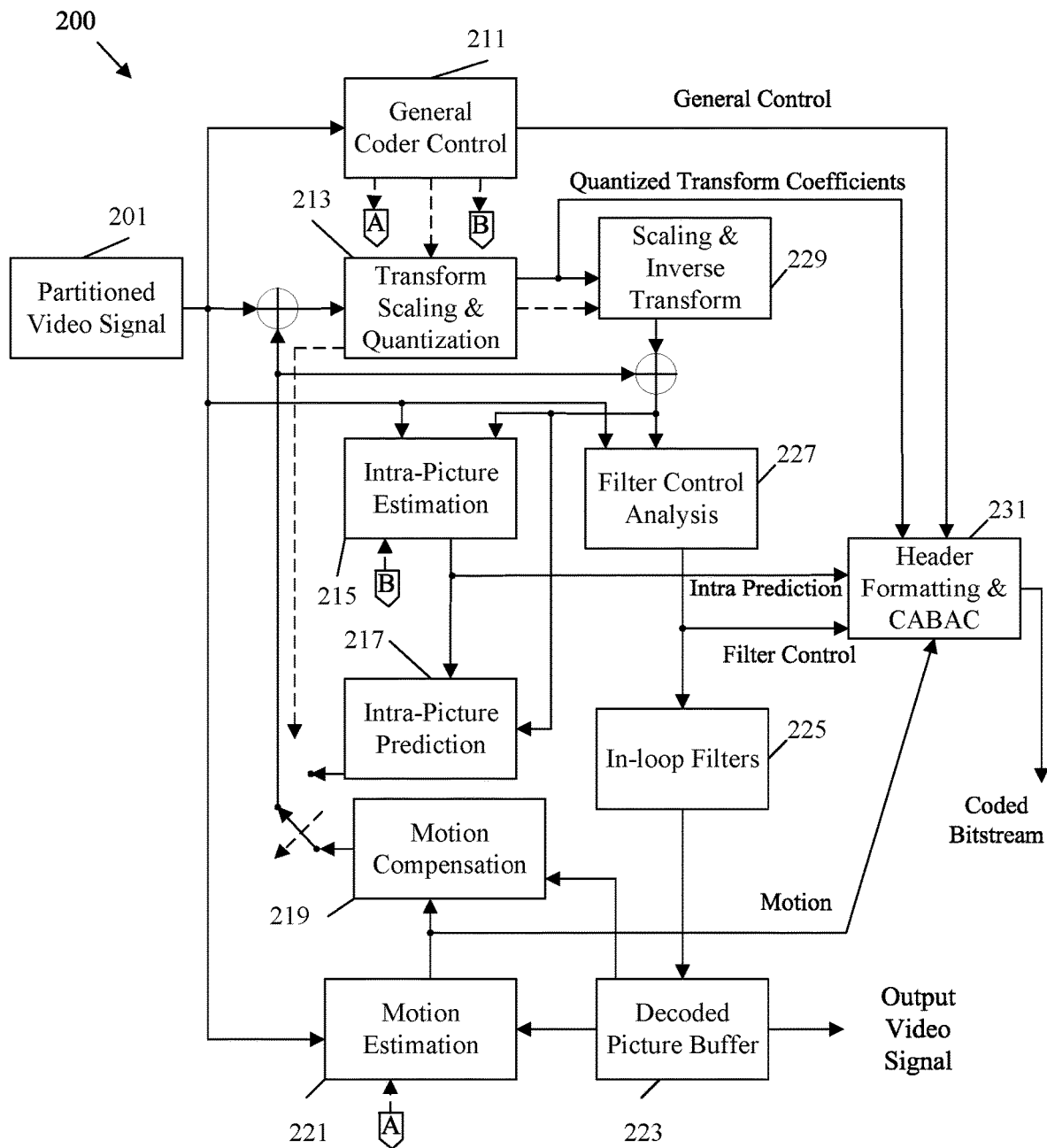
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
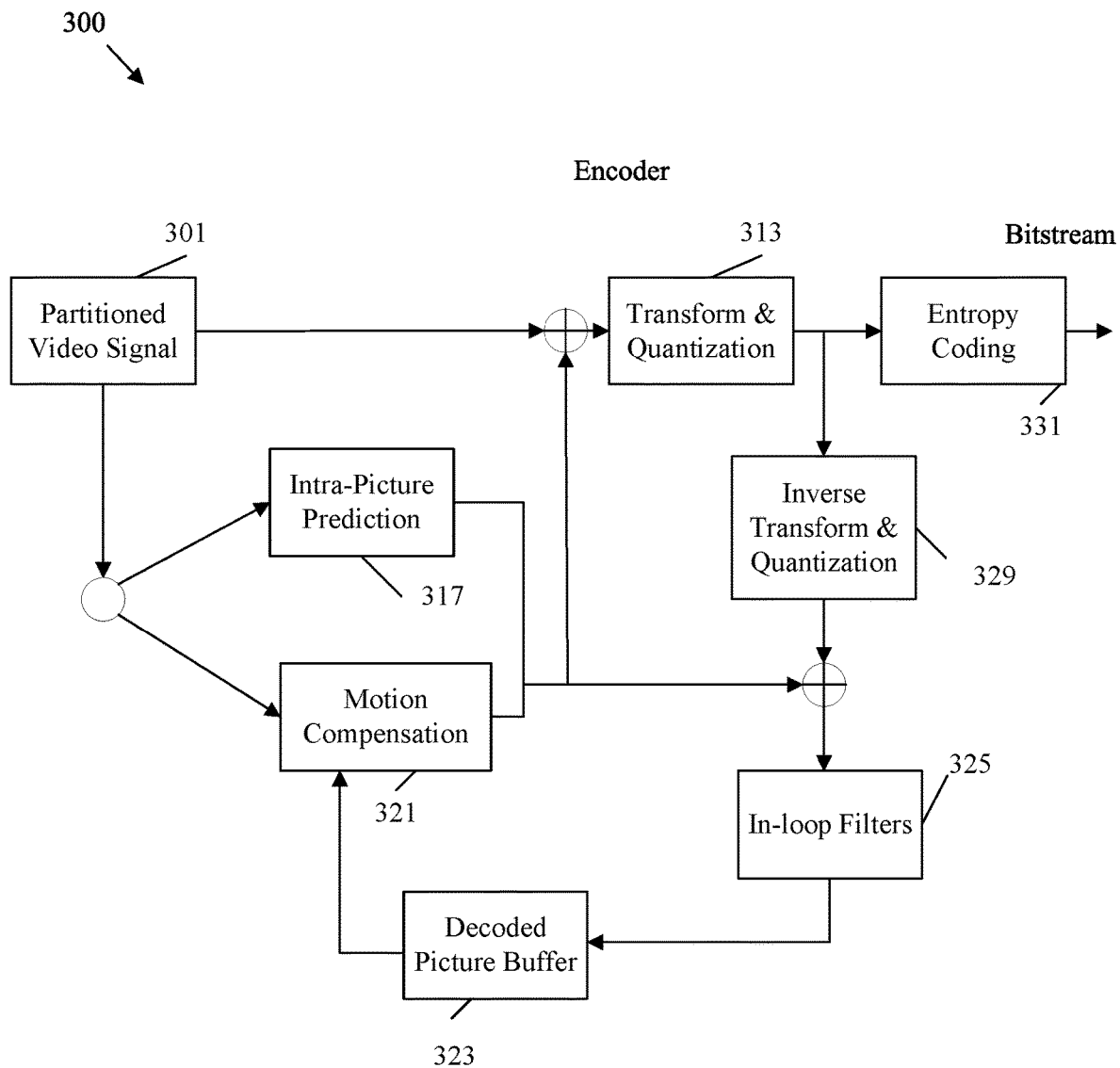
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
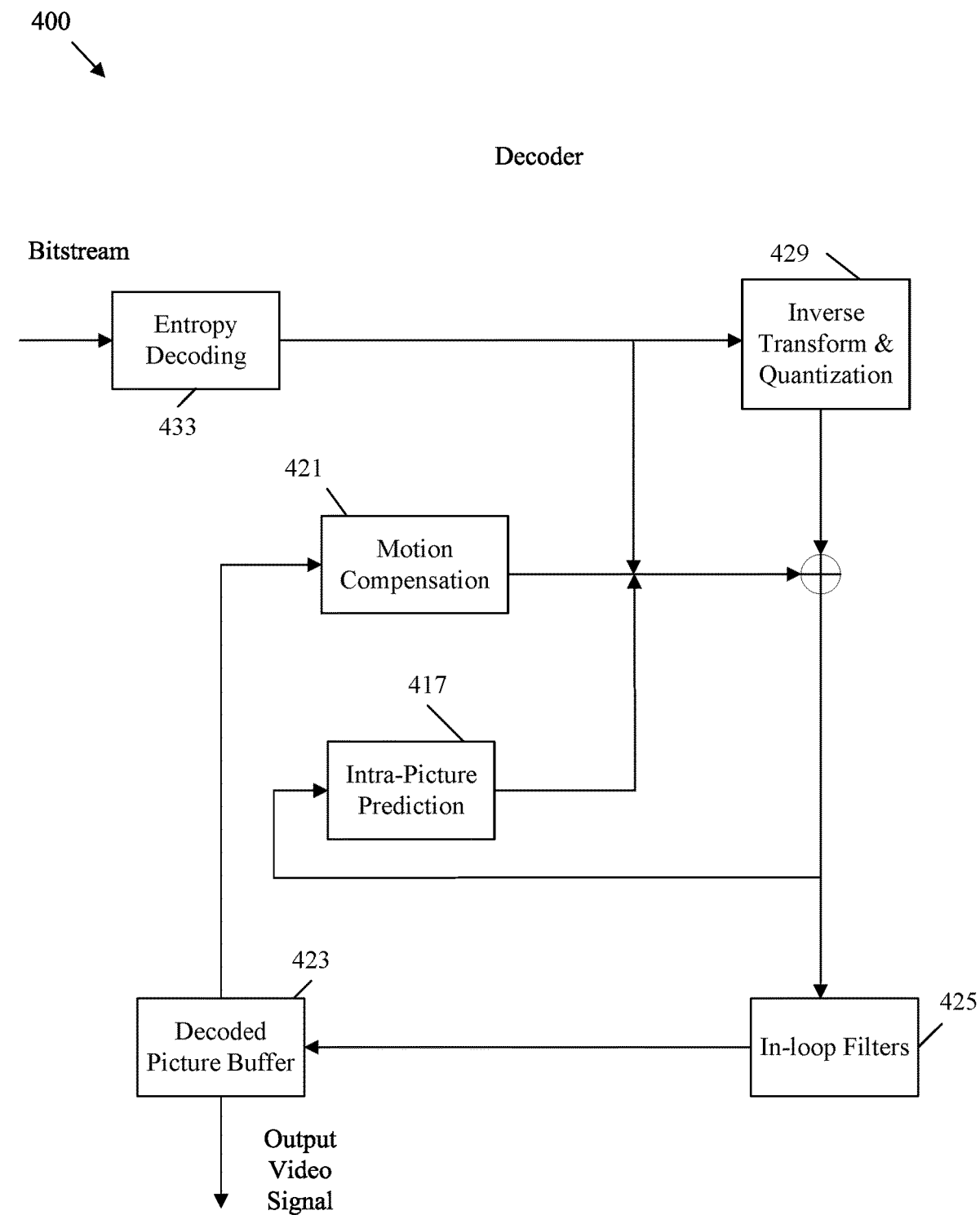
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
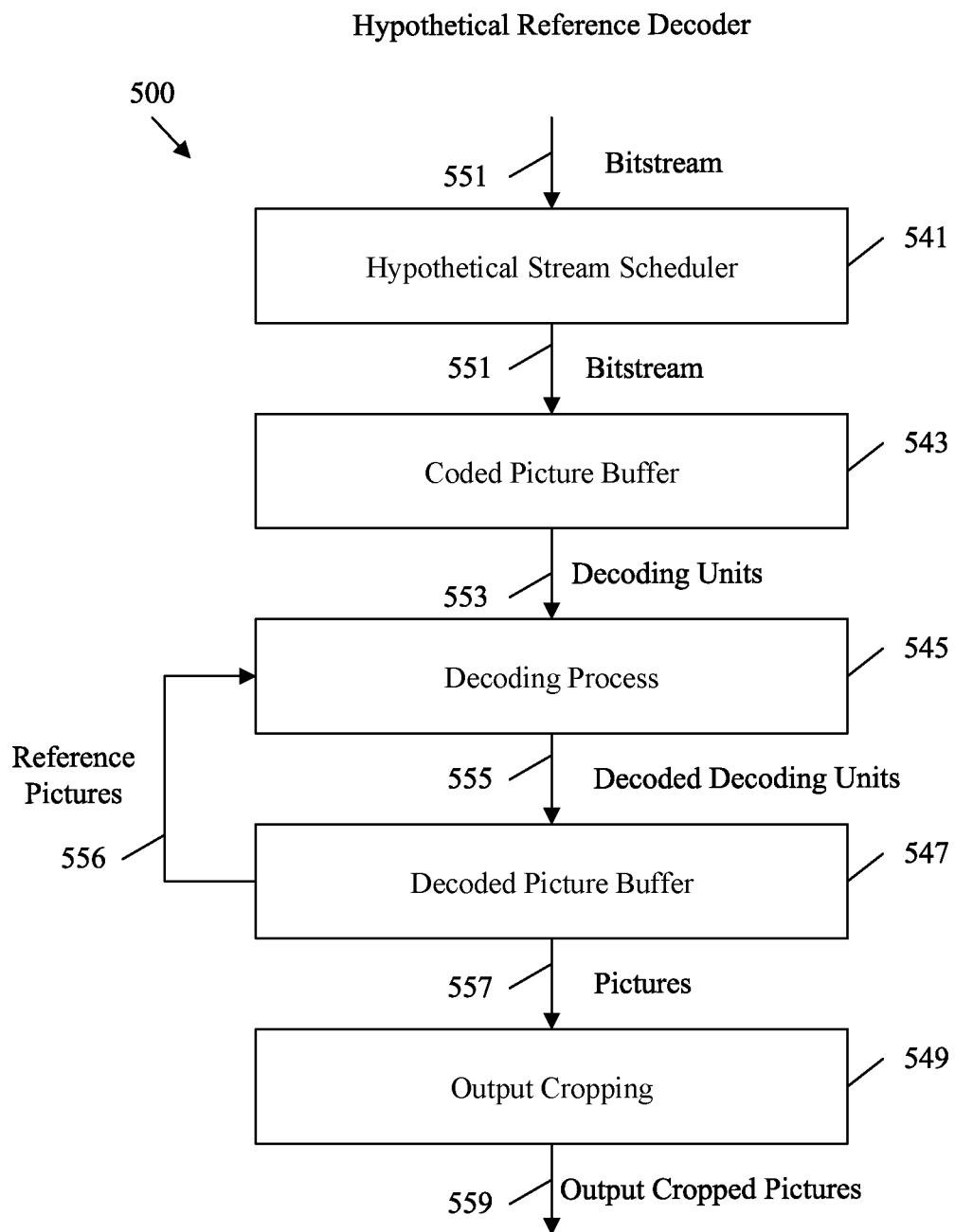
FIG. 5 is a schematic diagram illustrating an example hypothetical reference decoder (HRD).

FIG. 5 is a schematic diagram illustrating an example HRD 500. A HRD 500 may be employed in an encoder, such as codec system 200 and/or encoder 300. The HRD 500 may check the bitstream created at step 109 of method 100 before the bitstream is forwarded to a decoder, such as decoder 400. In some examples, the bitstream may be continuously forwarded through the HRD 500 as the bitstream is encoded. In the event that a portion of the bitstream fails to conform to associated constraints, the HRD 500 can indicate such failure to an encoder to cause the encoder to re-encode the corresponding section of the bitstream with different mechanisms.

The HRD 500 includes a hypothetical stream scheduler (HSS) 541. A HSS 541 is a component configured to perform a hypothetical delivery mechanism. The hypothetical delivery mechanism is used for checking the conformance of a bitstream or a decoder with regards to the timing and data flow of a bitstream 551 input into the HRD 500. For example, the HSS 541 may receive a bitstream 551 output from an encoder and manage the conformance testing process on the bitstream 551. In a particular example, the HSS 541 can control the rate that coded pictures move through the HRD 500 and verify that the bitstream 551 does not contain non-conforming data.

The HSS 541 may forward the bitstream 551 to a CPB 543 at a predefined rate. The HRD 500 may manage data in decoding units (DU) 553. A DU 553 is an Access Unit (AU) or a sub-set of an AU and associated non-video coding layer (VCL) network abstraction layer (NAL) units. Specifically, an AU contains one or more pictures associated with an output time. For example, an AU may contain a single picture in a single layer bitstream, and may contain a picture for each layer in a multi-layer bitstream. Each picture of an AU may be divided into slices that are each included in a corresponding VCL NAL unit. Hence, a DU 553 may contain one or more pictures, one or more slices of a picture, or combinations thereof. Also, parameters used to decode the AU/DU, pictures, and/or slices can be included in non-VCL NAL units. As such, the DU 553 contains non-VCL NAL units that contain data needed to support decoding the VCL NAL units in the DU 553. The CPB 543 is a first-in first-out buffer in the HRD 500. The CPB 543 contains DUs 553 including video data in decoding order. The CPB 543 stores the video data for use during bitstream conformance verification.

The CPB 543 forwards the DUs 553 to a decoding process component 545. The decoding process component 545 is a component that conforms to the VVC standard. For example, the decoding process component 545 may emulate a decoder 400 employed by an end user. The decoding process component 545 decodes the DUs 553 at a rate that can be achieved by an example end user decoder. If the decoding process component 545 cannot decode the DUs 553 fast enough to prevent an overflow (or prevent a buffer underrun) of the CPB 543, then the bitstream 551 does not conform to the standard and should be re-encoded.

The decoding process component 545 decodes the DUs 553, which creates decoded DUs 555. A decoded DU 555 contains a decoded picture. The decoded DUs 555 are forwarded to a DPB 547. The DPB 547 may be substantially similar to a decoded picture buffer component 223, 323, and/or 423. To support inter-prediction, pictures that are marked for use as reference pictures 556 that are obtained from the decoded DUs 555 are returned to the decoding process component 545 to support further decoding. The DPB 547 outputs the decoded video sequence as a series of pictures 557. The pictures 557 are reconstructed pictures that generally mirror pictures encoded into the bitstream 551 by the encoder.

The pictures 557 are forwarded to an output cropping component 549. The output cropping component 549 is configured to apply a conformance cropping window to the pictures 557. This results in output cropped pictures 559. An output cropped picture 559 is a completely reconstructed picture. Accordingly, the output cropped picture 559 mimics what an end user would see upon decoding the bitstream 551. As such, the encoder can review the output cropped pictures 559 to ensure the encoding is satisfactory.

The HRD 500 is initialized based on HRD parameters in the bitstream 551. For example, the HRD 500 may read HRD parameters from a VPS, a SPS, and/or SEI messages. The HRD 500 may then perform conformance testing operations on the bitstream 551 based on the information in such HRD parameters. As a specific example, the HRD 500 may determine one or more CPB delivery schedules from the HRD parameters. A delivery schedule specifies timing for delivery of video data to and/or from a memory location, such as a CPB and/or a DPB. Hence, a CPB delivery schedule specifies timing for delivery of AUs, DUs 553, and/or pictures, to/from the CPB 543. It should be noted that the HRD 500 may employ DPB delivery schedules for the DPB 547 that are similar to the CPB delivery schedules.

Video may be coded into different layers and/or OLSs for use by decoders with varying levels of hardware capabilities as well as for varying network conditions. The CPB delivery schedules are selected to reflect these issues. Accordingly, higher layer sub-bitstreams are designated for optimal hardware and network conditions and hence higher layers may receive one or more CPB delivery schedules that employ a large amount of memory in the CPB 543 and short delays for transfers of the DUs 553 toward the DPB 547. Likewise, lower layer sub-bitstreams are designated for limited decoder hardware capabilities and/or poor network conditions. Hence, lower layers may receive one or more CPB delivery schedules that employ a small amount of memory in the CPB 543 and longer delays for transfers of the DUs 553 toward the DPB 547. The OLSs, layers, sublayers, or combinations thereof can then be tested according to the corresponding delivery schedule to ensure that the resulting sub-bitstream can be correctly decoded under the conditions that are expected for the sub-bitstream. Accordingly, the HRD parameters in the bitstream 551 can indicate the CPB delivery schedules as well as include sufficient data to allow the HRD 500 to determine the CPB delivery schedules and correlate the CPB delivery schedules to the corresponding OLSs, layers, and/or sublayers.

Figure 6:
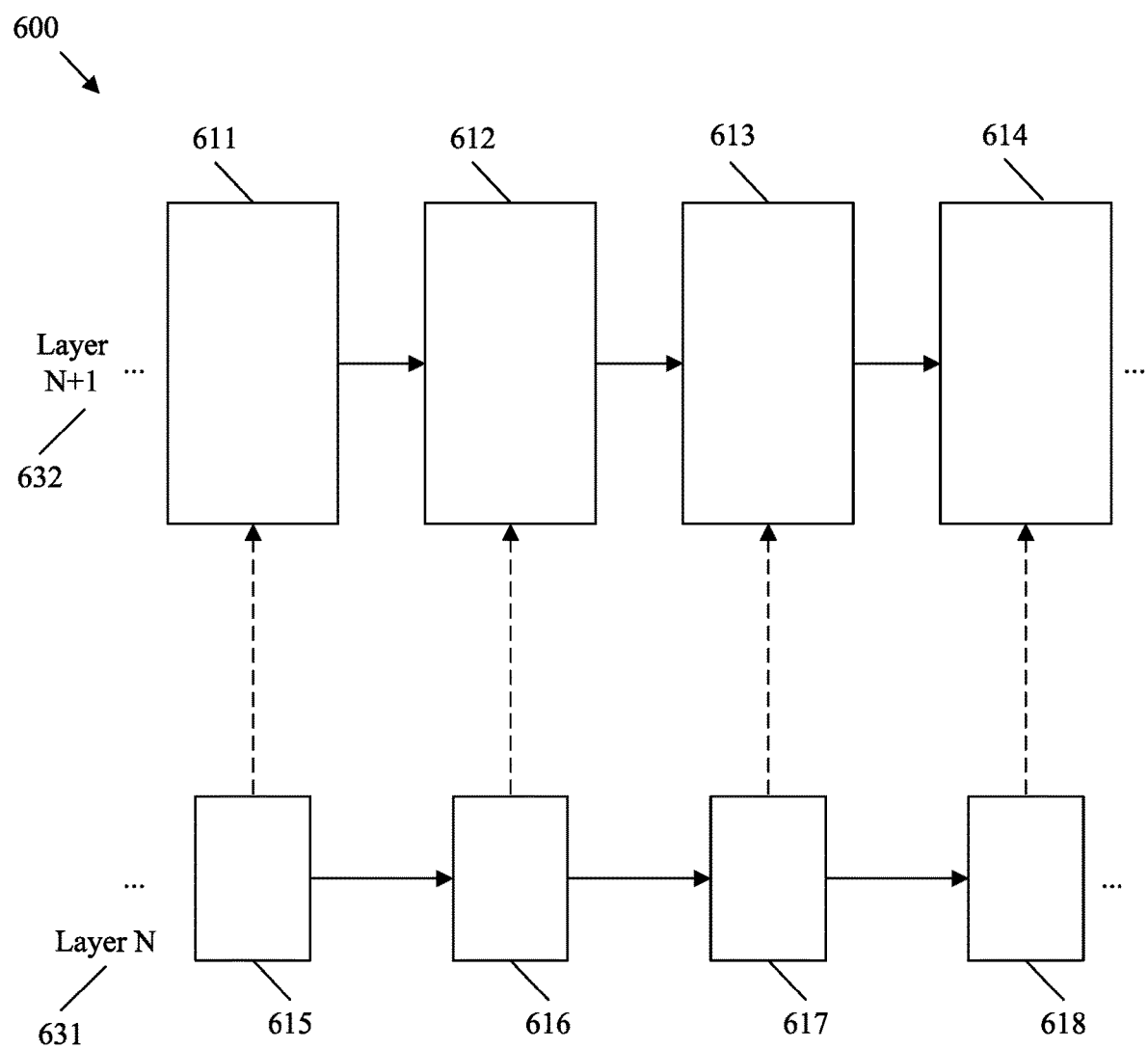
FIG. 6 is a schematic diagram illustrating an example multi-layer video sequence configured for inter-layer prediction.

FIG. 6 is a schematic diagram illustrating an example multi-layer video sequence 600 configured for inter-layer prediction 621. The multi-layer video sequence 600 may be encoded by an encoder, such as codec system 200 and/or encoder 300 and decoded by a decoder, such as codec system 200 and/or decoder 400, for example according to method 100. Further, the multi-layer video sequence 600 can be checked for standard conformance by a HRD, such as HRD 500. The multi-layer video sequence 600 is included to depict an example application for layers in a coded video sequence. A multi-layer video sequence 600 is any video sequence that employs a plurality of layers, such as layer N 631 and layer N+1 632.

In an example, the multi-layer video sequence 600 may employ inter-layer prediction 621. Inter-layer prediction 621 is applied between pictures 611, 612, 613, and 614 and pictures 615, 616, 617, and 618 in different layers. In the example shown, pictures 611, 612, 613, and 614 are part of layer N+1 632 and pictures 615, 616, 617, and 618 are part of layer N 631. A layer, such as layer N 631 and/or layer N+1 632, is a group of pictures that are all associated with a similar value of a characteristic, such as a similar size, quality, resolution, signal to noise ratio, capability, etc. A layer may be defined formally as a set of VCL NAL units and associated non-VCL NAL units. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations.

In the example shown, layer N+1 632 is associated with a larger image size than layer N 631. Accordingly, pictures 611, 612, 613, and 614 in layer N+1 632 have a larger picture size (e.g., larger height and width and hence more samples) than pictures 615, 616, 617, and 618 in layer N 631 in this example. However, such pictures can be separated between layer N+1 632 and layer N 631 by other characteristics. While only two layers, layer N+1 632 and layer N 631, are shown, a set of pictures can be separated into any number of layers based on associated characteristics. Layer N+1 632 and layer N 631 may also be denoted by a layer Id. A layer Id is an item of data that is associated with a picture and denotes the picture is part of an indicated layer. Accordingly, each picture 611-618 may be associated with a corresponding layer Id to indicate which layer N+1 632 or layer N 631 includes the corresponding picture. For example, a layer Id may include a NAL unit header layer identifier (nuh_layer_id), which is a syntax element that specifies an identifier of a layer that includes a NAL unit (e.g., that include slices and/or parameters of the pictures in a layer). A layer associated with a lower quality/bitstream size, such as layer N 631, is generally assigned a lower layer Id and is referred to as a lower layer. Further, a layer associated with a higher quality/bitstream size, such as layer N+1 632, is generally assigned a higher layer Id and is referred to as a higher layer.

Pictures 611-618 in different layers 631-632 are configured to be displayed in the alternative. As a specific example, a decoder may decode and display picture 615 at a current display time if a smaller picture is desired or the decoder may decode and display picture 611 at the current display time if a larger picture is desired. As such, pictures 611-614 at higher layer N+1 632 contain substantially the same image data as corresponding pictures 615-618 at lower layer N 631 (notwithstanding the difference in picture size). Specifically, picture 611 contains substantially the same image data as picture 615, picture 612 contains substantially the same image data as picture 616, etc.

Pictures 611-618 can be coded by reference to other pictures 611-618 in the same layer N 631 or N+1 632. Coding a picture in reference to another picture in the same layer results in inter-prediction 623. Inter-prediction 623 is depicted by solid line arrows. For example, picture 613 may be coded by employing inter-prediction 623 using one or two of pictures 611, 612, and/or 614 in layer N+1 632 as a reference, where one picture is referenced for unidirectional inter-prediction and/or two pictures are referenced for bidirectional inter-prediction. Further, picture 617 may be coded by employing inter-prediction 623 using one or two of pictures 615, 616, and/or 618 in layer N 631 as a reference, where one picture is referenced for unidirectional inter-prediction and/or two pictures are referenced for bidirectional inter-prediction. When a picture is used as a reference for another picture in the same layer when performing inter-prediction 623, the picture may be referred to as a reference picture. For example, picture 612 may be a reference picture used to code picture 613 according to inter-prediction 623. Inter-prediction 623 can also be referred to as intra-layer prediction in a multi-layer context. As such, inter-prediction 623 is a mechanism of coding samples of a current picture by reference to indicated samples in a reference picture that is different from the current picture where the reference picture and the current picture are in the same layer.

Pictures 611-618 can also be coded by reference to other pictures 611-618 in different layers. This process is known as inter-layer prediction 621, and is depicted by dashed arrows. Inter-layer prediction 621 is a mechanism of coding samples of a current picture by reference to indicated samples in a reference picture where the current picture and the reference picture are in different layers and hence have different layer IDs. For example, a picture in a lower layer N 631 can be used as a reference picture to code a corresponding picture at a higher layer N+1 632. As a specific example, picture 611 can be coded by reference to picture 615 according to inter-layer prediction 621. In such a case, the picture 615 is used as an inter-layer reference picture. An inter-layer reference picture is a reference picture used for inter-layer prediction 621. In most cases, inter-layer prediction 621 is constrained such that a current picture, such as picture 611, can only use inter-layer reference picture(s) that are included in the same AU and that are at a lower layer, such as picture 615. When multiple layers (e.g., more than two) are available, inter-layer prediction 621 can encode/decode a current picture based on multiple inter-layer reference picture(s) at lower levels than the current picture.

A video encoder can employ a multi-layer video sequence 600 to encode pictures 611-618 via many different combinations and/or permutations of inter-prediction 623 and inter-layer prediction 621. For example, picture 615 may be coded according to intra-prediction. Pictures 616-618 can then be coded according to inter-prediction 623 by using picture 615 as a reference picture. Further, picture 611 may be coded according to inter-layer prediction 621 by using picture 615 as an inter-layer reference picture. Pictures 612-614 can then be coded according to inter-prediction 623 by using picture 611 as a reference picture. As such, a reference picture can serve as both a single layer reference picture and an inter-layer reference picture for different coding mechanisms. By coding higher layer N+1 632 pictures based on lower layer N 631 pictures, the higher layer N+1 632 can avoid employing intra-prediction, which has much lower coding efficiency than inter-prediction 623 and inter-layer prediction 621. As such, the poor coding efficiency of intra-prediction can be limited to the smallest/ lowest quality pictures, and hence limited to coding the smallest amount of video data. The pictures used as reference pictures and/or inter-layer reference pictures can be indicated in entries of reference picture list(s) contained in a reference picture list structure.

It should be noted that layers, such as layer N+1 632 and layer N 631, can be included in output layer sets (OLSs). An OLS is a set of one or more layers, where at least one layer is an output layer. For example, layer N 631 can be included in a first OLS and layer N 631 and layer N-1 632 can both be included in a second OLS. This allows a different OLSs to be sent to different decoders, depending on decoder side conditions. For example, a sub-bitstream extraction process can remove data that is unrelated to a target OLS from the multi-layer video sequence 600 before the target OLS is sent to a decoder. As such, an encoded copy of the multi-layer video sequence 600 can be stored at an encoder (or a corresponding content server), and various OLSs can be extracted and sent to different decoders upon request.

It should also be noted that different layers, such as layer N+1 632 and layer N 631, may be associated with different memory requirements at a HRD and/or a decoder. Specifically, decoded pictures in a DPB may be marked as used for long-term reference, used for short-term reference, or unused for reference. The reference picture marking process may be invoked each time a new picture is decoded (e.g., when a new picture becomes the current picture). Specifically, the reference picture marking process may be applied to each picture in the DPB each time the decoding process is applied to a new picture. A picture that is marked as unused for reference is either stored until the picture can be output or is immediately removed from the DPB if the picture is not scheduled for output. Accordingly, a layer, such as layer N+1 632 and/or layer N 631, that is an output layer uses DPB space to hold reference pictures and to hold pictures until such pictures can be output. However, a layer, such as layer N+1 632 and/or layer N 631, that is only used as a reference layer for inter-layer prediction 621 (and is not an output layer) only retains pictures that are used for reference. A layer that is not an output layer does not need to retain pictures that are marked as unused for reference because pictures from non-output layers are never output. As such, output layers employ more DPB space than layers that are used only for reference (e.g., non-output layers). For example, output layers may employ about twice as much memory space in a DPB than a reference layer that is not an output layer.

Figure 7:
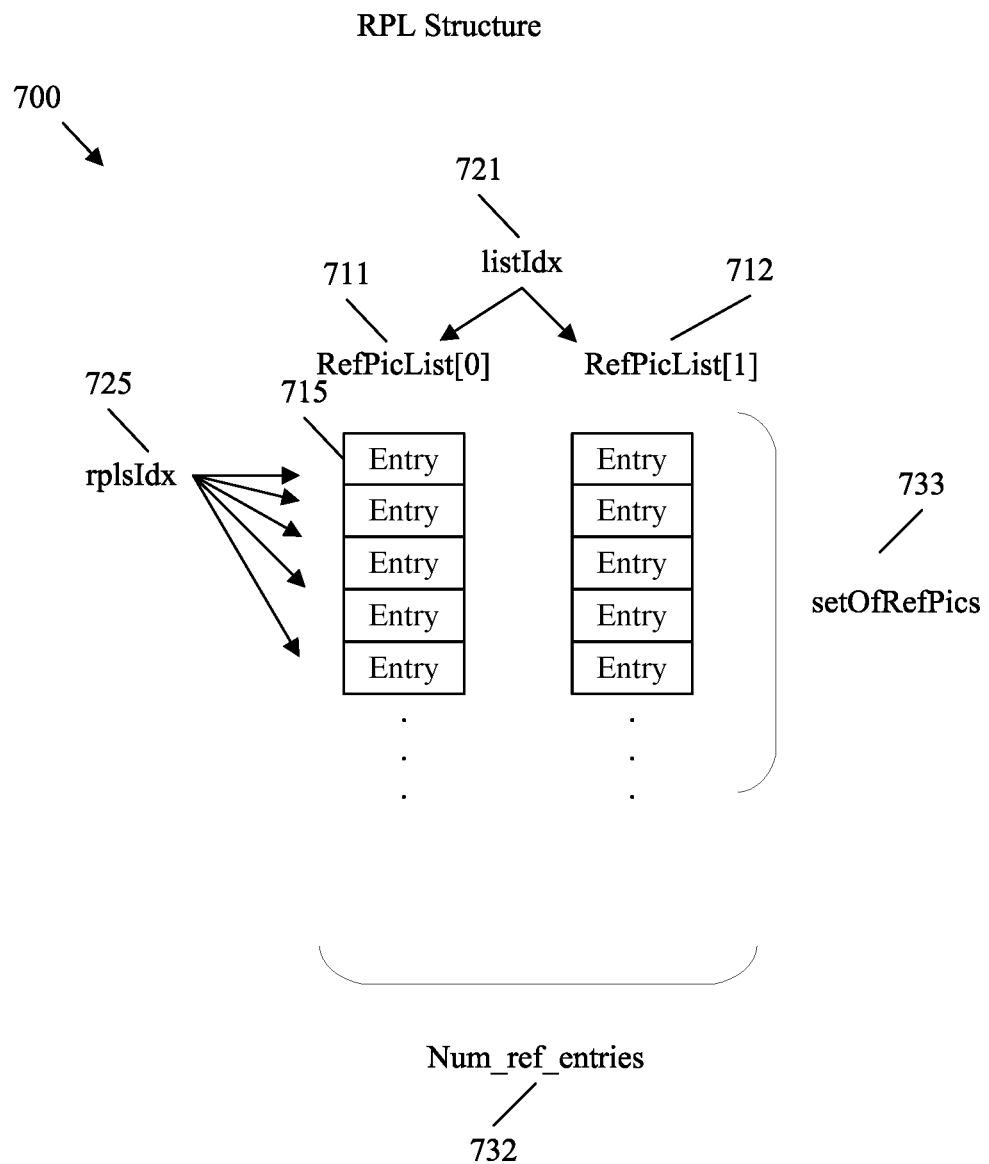
FIG. 7 is a schematic diagram illustrating an example reference picture list structure.

FIG. 7 is a schematic diagram illustrating an example reference picture list (RPL) structure 700. A RPL structure 700 can be employed to store indications of reference pictures and/or inter-layer reference pictures used in inter-prediction 623 and/or inter-layer prediction 621 when coding a video sequence, such as a multi-layer video sequence 600. Hence, the RPL structure 700 can be employed by a codec system 200, an encoder 300, and/or a decoder 400 when performing method 100. Further, a RPL structure 700 can be employed by a HRD, such as HRD 500, when performing conformance tests on a bitstream containing an encoded video sequence.

RPL structure 700 is an addressable syntax structure that contains multiple reference picture lists, such as reference picture list zero (RefPicList[0]) 711 and reference picture list one (RefPicList[1]) 712. The RPL structure 700 may be stored in a sequence parameter set (SPS), picture parameter set (PPS), and/or a slice header of a bitstream, depending on the example. A reference picture list, such as RefPicList[0] 711 and RefPicList[1] 712, is a list of reference pictures used for inter-prediction and/or inter-layer prediction. RefPicList [0] 711 and RefPicList[1] 712 may each include a plurality of entries 715. A reference picture list structure entry 715 is an addressable location in a RPL structure 700 that indicates a reference picture associated with a reference picture list, such as RefPicList[0] 711 and/or RefPicList[1]712. Each entry 715 may contain a picture order count (POC) value (or other pointer value) that references a picture used for inter-prediction. Specifically, references to pictures used by unidirectional inter-prediction are stored in RefPicList[0] 711 and references to pictures used by bidirectional inter-prediction are stored in both RefPicList[0] 711 and RefPicList[1] 712. For example, unidirectional inter-prediction may code a block of a current picture by reference to a block in one reference picture indicated by RefPicList[0] 711. Further, bidirectional inter-prediction may code a block of a current picture by reference to a block in one reference picture indicated by RefPicList[0] 711 and in one reference picture indicated by RefPicList[1] 712. It should be noted that a slice that is coded according to unidirectional prediction is referred to as a P slice and a slice that is coded according to bidirectional prediction is referred to as a B slice. As such, RefPicList[0] 711 is a reference picture list used for inter-prediction (e.g., containing a list of corresponding reference pictures) of a unidirectional prediction (P) slice or the first of two reference picture lists used for inter-prediction of a bidirectional prediction (B) slice. Further, RefPicList[1] 712 is a second reference picture list used for inter-prediction of a B slice (e.g., in conjunction with RefPicList[0]).

In a specific example, the RPL structure 700 can be denoted as ref_pic_list_struct(listIdx, rplsIdx) where listIdx 721 is an index that identifies a corresponding reference picture list, such as RefPicList[0] 711 and/or RefPicList[1] 712, and rplsIdx 725 is an index that indicates a reference entry 715 in a corresponding reference picture list. Accordingly, ref_pic_list_struct( ) is a syntax structure that returns a reference entry 715 based on listIdx 721 and rplsIdx 725. A ref_pic_list_struct( ) can also be defined as a syntax structure containing RefPicList[0] and RefPicList[1]. An encoder can encode a portion of the RPL structure 700 for each non-intra-coded slice in a video sequence. A decoder can then resolve the corresponding portion of the RPL structure 700 before decoding each non-intra-coded slice in a coded video sequence. For example, portions of the RPL structure 700 that are relevant to many pictures in a sequence can be stored in a SPS, portions of the RPL structure 700 that apply to a small number of pictures can be stored in a PPS, and portions of the RPL structure 700 that apply to a specific slice can be stored in a slice header.

A set of reference pictures (setOfRefPics) 733 is a set of unique pictures referred to by all entries in RefPicList[ 0] 711 that have the same nuh_layer_id as the current picture and all entries in RefPicList[ 1] 712 that have the same nuh_layer_id as the current picture. The RefPicList[0] 711 and the RefPicList[1] 712 may be slice specific. Accordingly, the setOfRefPics 733 may contain a set of unique reference pictures for a current slice in a current picture, where the set of unique reference pictures are contained in the same layer as the current picture. In some systems, the number of reference pictures in the setOfRefPics 733 may be constrained by a static value that is global to all layers. However, a noted above, the amount of DPB space used may vary depending on whether a layer is an output layer or not. As such, applying the same static maximum value of pictures to the setOfRefPics 733 regardless of layer may result in an inefficient memory allocation. For example, a static maximum value may overly restrict the number of pictures that can be present in the setOfRefPics 733 for output layers and/or may not be restrictive enough for reference layers (non-output layers). The present example addresses this issue by constraining the setOfRefPics 733 based on a maximum decoded picture buffer size. The maximum decoded picture buffer size varies depending on whether a layer is a reference layer or an output layer. As such, the setOfRefPics 733 is instead constrained based on the amount of available memory space in the DPB for each layer and not based on an arbitrary static value. Therefore, the setOfRefPics 733 can be dynamically restricted to different sizes depending on whether the corresponding layer is an output layer or a reference layer.

In some examples, an encoder can also signal a number of reference entries (num_ref_entries) 732 in the RPL structure 700. The num_ref_entries 732 is a syntax element that indicates the number of reference entries in a RPL structure 700. The num_ref_entries 732 can be denoted as num_ref_entries [listIdx][ rplsIdx]. As with the setOfRefPics 733, some video coding systems limit the num_ref_entries 732 based on a static value that may be overly restrictive or overly permissive depending on whether a layer is an output layer or only a reference layer. The present disclosure may also constrain the num_ref_entries 732 based on a maximum decoded picture buffer size. As such, the num_ref_entries 732 is instead constrained based on the amount of available memory space in the DPB for the corresponding layer and not based on an arbitrary static value that is global to all layers. Therefore, the num_ref_entries 732 can be dynamically restricted to different sizes depending on whether the corresponding layer is an output layer or a reference layer.

Figure 8:
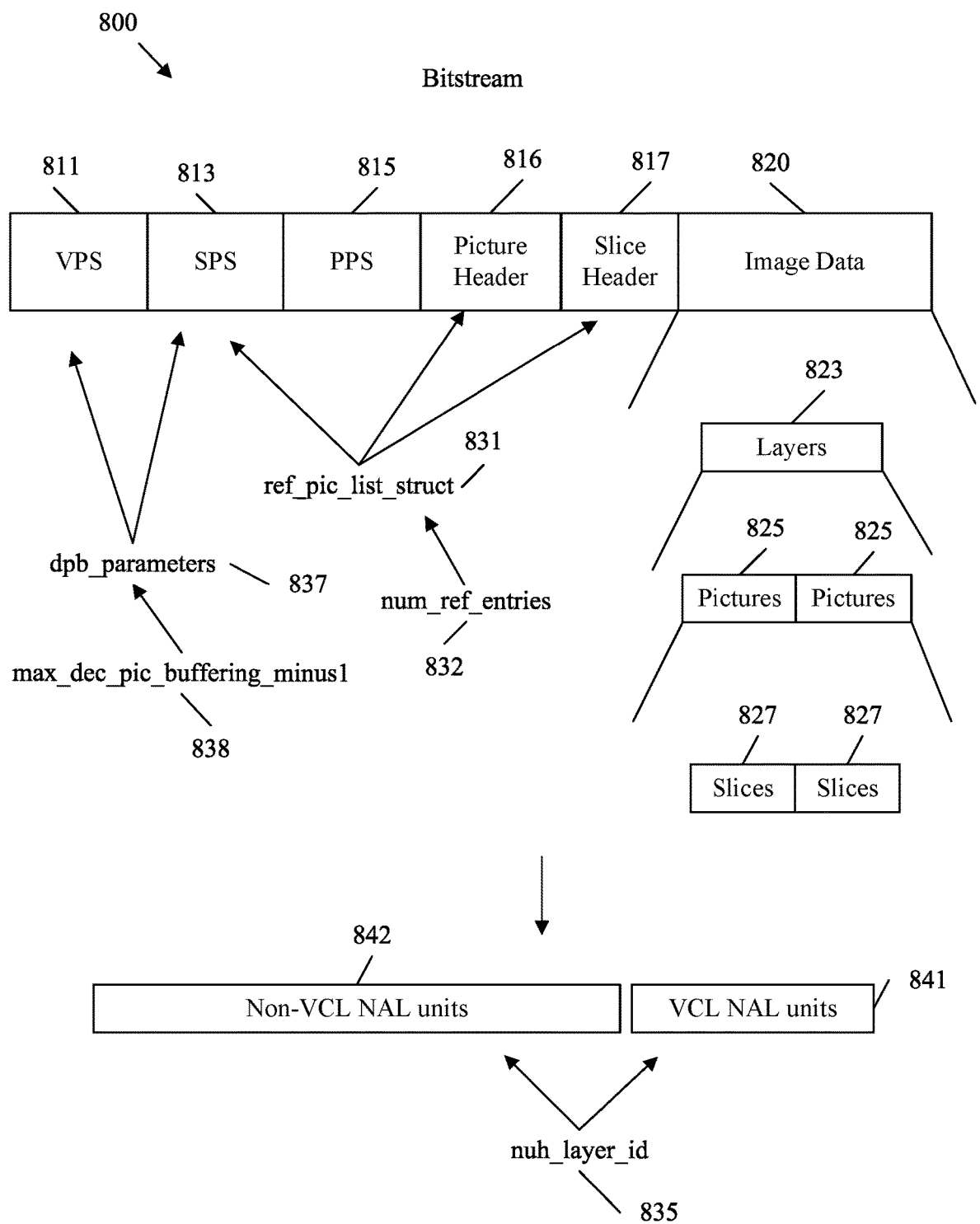
FIG. 8 is a schematic diagram illustrating an example bitstream.

FIG. 8 is a schematic diagram illustrating an example bitstream 800. For example, the bitstream 800 can be generated by a codec system 200 and/or an encoder 300 for decoding by a codec system 200 and/or a decoder 400 according to method 100. Further, the bitstream 800 may include an encoded multi-layer video sequence 600, which may be coded by employing a RPL structure 700. In addition, the bitstream 800 may include various parameters to control the operation of a HRD, such as HRD 500. Based on such parameters, the HRD 500 can check the bitstream 800 for conformance with standards prior to transmission toward a decoder for decoding.

The bitstream 800 includes a VPS 811, one or more SPSs 813, a plurality of picture parameter sets (PPSs) 815, a plurality of picture headers 816, a plurality of slice headers 817, and image data 820. A VPS 811 contains data related to the entire bitstream 800. For example, the VPS 811 may contain data related OLSs, layers, and/or sublayers used in the bitstream 800. An SPS 813 contains sequence data common to all pictures in a coded video sequence contained in the bitstream 800. For example, each layer may contain one or more coded video sequences, and each coded video sequence may reference a SPS 813 for corresponding parameters. The parameters in a SPS 813 can include picture sizing, bit depth, coding tool parameters, bit rate restrictions, etc. It should be noted that, while each sequence refers to a SPS 813, a single SPS 813 can contain data for multiple sequences in some examples. The PPS 815 contains parameters that apply to an entire picture. Hence, each picture in the video sequence may refer to a PPS 815. It should be noted that, while each picture refers to a PPS 815, a single PPS 815 can contain data for multiple pictures in some examples. For example, multiple similar pictures may be coded according to similar parameters. In such a case, a single PPS 815 may contain data for such similar pictures.

The PPS 815 can indicate coding tools available for slices in corresponding pictures, quantization parameters, offsets, etc.

A slice header 817 contains parameters that are specific to a corresponding slice 827 in a picture 825. Hence, there may be one slice header 817 per slice 827 in the video sequence. The slice header 817 may contain slice type information, picture order counts (POCs), reference picture lists, prediction weights, tile entry points, deblocking parameters, etc. It should be noted that in some examples, a bitstream 800 may also include a picture header 816, which is a syntax structure that contains parameters that apply to all slices 827 in a single picture 825. For this reason, a picture header 816 and a slice header 817 may be used interchangeably in some contexts. For example, certain parameters may be moved between the slice header 817 and a picture header 816 depending on whether such parameters apply to a specific slice 827 or are common to all slices 827 in a picture 825.

The image data 820 contains video data encoded according to inter-prediction, inter-layer prediction, and/or intra-prediction as well as corresponding transformed and quantized residual data. For example, the image data 820 may include layers 823, pictures 825, and/or slices 827. A layer 823 is a set of VCL NAL units 841 that share a specified characteristic (e.g., a common resolution, frame rate, image size, etc.) as indicated by a layer ID, such as a nuh_layer_id 835, and associated non-VCL NAL units 842. For example, a layer 823 may include a set of pictures 825 that share the same nuh_layer_id 835 along with any parameter sets used to decode the pictures 825 in the layer 823. For example, a layers 823 be substantially similar to layer N 631 and/or layer N+1 632, respectively, from FIG. 6.

A nuh_layer_id 835 is a syntax element that specifies an identifier of a layer 823 that includes at least one NAL unit. For example, a lowest quality layer, known as a base layer, may include the lowest value of nuh_layer_id 835 with increasing values of nuh_layer_id 835 for layers of higher quality. Hence, a lower layer is a layer 823 with a smaller value of nuh_layer_id 835 and a higher layer is a layer 823 with a larger value of nuh_layer_id 835. The data of a layer 823 are correlated based on the nuh_layer_id 835. For example, parameter sets and video data may be associated with a value of nuh_layer_id 835 that corresponds to the lowest layer 823 that includes such parameter sets/video data. As such, a set of VCL NAL units 841 are part of a layer 823 when the set of VCL NAL units 841 all have a particular value of nuh_layer_id 835.

A picture 825 is an array of luma samples and/or an array of chroma samples that create a frame or a field thereof. For example, a picture 825 is a coded image that may be output for display or used to support coding of other picture(s) for output. A picture 825 contains one or more slices 827. A slice 827 may be defined as an integer number of complete tiles or an integer number of consecutive complete coding tree unit (CTU) rows (e.g., within a tile) of a picture 825 that are exclusively contained in a single NAL unit, such as a VCL NAL unit 841. The slices 827 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

A bitstream 800 can be coded as a sequence of NAL units. A NAL unit is a container for video data and/or supporting syntax. A NAL unit can be a VCL NAL unit 841 or a non-VCL NAL unit 842. A VCL NAL unit 841 is a NAL unit coded to contain video data, such as image data 820 and an associated slice header 817. As a specific example, each slice 827 and an associated slice header 817 can be encoded in a single VCL NAL unit 841. A non-VCL NAL unit 842 is a NAL unit that contains non-video data such as syntax and/or parameters that support decoding the video data, performance of conformance checking, or other operations. For example, a non-VCL NAL unit 842 can contain a VPS 811, a SPS 813, a PPS 815, a picture header 816, or other supporting syntax. As such, a bitstream 800 is a series of VCL NAL units 841 and non-VCL NAL units 842. Each NAL unit contains a nuh_layer_id 835, which allows an encoder or decoder to determine which layer 823 includes the corresponding NAL unit.

A bitstream 800 including multiple layers 823 may be encoded and stored until requested by a decoder. For example, a decoder can request a layer 823, and/or an OLS containing multiple layers 823. In a particular example, layers 823 may include a base layer and one or more enhancement layers. The encoder and/or a content server should send only the layers 823 to the decoder that are needed to decode requested output layer(s).

The bitstream may include a ref_pic_list_struct 831, which may be substantially similar to RPL structure 700 in FIG. 7. The ref_pic_list_struct 831 can contain a RefPicList[0] and a RefPicList[1] that reference a setofRefPics used to code blocks in the slices 827 according to inter-prediction and/or inter-layer prediction. The ref_pic_list_struct 831 can also include a num_ref_entries 832, which is substantially similar to num_ref_entries 732 in FIG. 7. Accordingly, the num_ref_entries 832 indicates the number of reference entries in a ref_pic_list_struct 831. The ref_pic_list_struct 831 can be stored in the SPS 813, the picture header 816, and/or the slice header 817 depending on the scope of the ref_pic_list_struct 831. For example, a ref_pic_list_struct 831 that references reference pictures for an entire sequence is contained a SPS 813, a ref_pic_list_struct 831 that references reference pictures for an entire picture 825 is contained a picture header 816, and a ref_pic_list_struct 831 that references reference pictures for a slice 827 is contained a slice header 817.

The bitstream 800 may also include decoded picture buffer parameters (dpb_parameters) 837. The dpb_parameters 837 is syntax structure provides information of DPB size, maximum picture reorder number, and maximum latency for one or more OLSs. Accordingly, the dpb_parameters 837 specify the function of the DPB during the decoding process. As a specific example, the dpb_parameters 837 may contain a maximum decoded picture buffer minus one (max_dec_pic_buffering_minus1) 838, which is a syntax element that specifies a maximum required size of the DPB in units of picture storage buffers. The dpb_parameters 837 may be stored in the VPS 811 and/or the SPS 813, depending on scope. For example, dpb_parameters 837 that apply to an entire video can be stored in the VPS 811, while dpb_parameters 837 that apply to a particular video sequence and/or a particular layer 823 can be stored in the SPS 813.

As noted above, a ref_pic_list_struct 831, also denoted as ref_pic_list_struct(listIdx, rplsIdx), may be employed to keep track of the references between pictures to support reconstruction of inter-predicted pictures. In some video coding systems, the ref_pic_list_struct 831 includes a maximum number of reference entries that can be employed for a current picture. Specifically, in some video coding systems the maximum number of reference entries for a current picture is a statically defined value that is global to all layers.

This results in limiting the num_ref_entries 832, also denoted as num_ref_entries [listIdx][ rplsIdx] based on the statically defined value regardless of layer. This also results in limiting the setOfRefPics 733 of FIG. 7 referred to by the ref_pic_list_struct 831 based on the statically defined value regardless of layer. The problem with this approach is that reference layers use a different amount of space in a decoded picture buffer than output layers. For example, reference layers use space for picture reconstruction, while output layers use space for both picture reconstruction and storage pending output. Accordingly, a statically defined maximum number of reference entries selected to support the smaller amount of space used for reference layers may be overly restrictive when applied to pictures in output layers. Alternatively, a statically defined maximum number of reference entries selected for output layers may provide more space than is needed for decoding pictures in reference layers, and hence may waste memory resources.

To address the abovementioned problems, bitstream 800 constrains the ref_pic_list_struct 831 to support different picture buffer usage for different types of layers 823. For example, the num_ref_entries 832, which indicates the number of reference entries in the ref_pic_list_struct 831 are used for each picture, is constrained to maintain a range that is selected based on a maximum decoded picture buffer size. The maximum decoded picture buffer size varies depending on whether a layer is a reference layer or an output layer. Accordingly, constraining the num_ref_entries 832 based on the maximum decoded picture buffer size allows different numbers of reference pictures to be employed for output layers and reference layers. In a particular example, max_dec_pic_buffering_minus1 838 in the dpb_parameters 837 specifies a maximum required size of the DPB for a corresponding layer. Accordingly, an encoder and/or HRD can derive a maximum decoded picture buffer size based on the max_dec_pic_buffering_minus1 838 and constrain the num_ref_entries 832 based on the maximum decoded picture buffer size. The decoder can also receive a ref_pic_list_struct 831 with a num_ref_entries 832 that has been constrained based on the maximum decoded picture buffer size. Regardless of the example, the num_ref_entries 832 is constrained based on the maximum decoded picture buffer size that is layer specific and not a statically defined value that is global to all layers. In a further example, the setOfRefPics 733 of FIG. 7, can be constrained in a similar manner. For example, an encoder and/or HRD can derive a maximum decoded picture buffer size based on the max_dec_pic_buffering_minus1 838 and constrain the setOfRefPics 733 based on the maximum decoded picture buffer size. The decoder can also receive a ref_pic_list_struct 831 with a setOfRefPics 733 that has been constrained based on the maximum decoded picture buffer size. Regardless of the example, the setOfRefPics 733 is constrained based on the maximum decoded picture buffer size that is layer specific and not a statically defined value that is global to all layers. Employing such a constraint supports more efficient allocation of memory at the decoded picture buffer, and hence supports increased coding efficiency as more optimal memory usage encourages more efficient encodings. As a result, the functionality of the encoder and the decoder is increased. Further, coding efficiency is increased, which reduces processor, memory, and/or network signaling resource usage at both the encoder and the decoder.

The preceding information is now described in more detail herein below. Layered video coding is also referred to as scalable video coding or video coding with scalability. Scalability in video coding may be supported by using multi-layer coding techniques. A multi-layer bitstream comprises a base layer (BL) and one or more enhancement layers (ELs). Example of scalabilities includes spatial scalability, quality/signal to noise ratio (SNR) scalability, multi-view scalability, frame rate scalability, etc. When a multi-layer coding technique is used, a picture or a part thereof may be coded without using a reference picture (intra-prediction), may be coded by referencing reference pictures that are in the same layer (inter-prediction), and/or may be coded by referencing reference pictures that are in other layer(s) (inter-layer prediction). A reference picture used for inter-layer prediction of the current picture is referred to as an inter-layer reference picture (ILRP). FIG. 6 illustrates an example of multi-layer coding for spatial scalability in which pictures in different layers have different resolutions.

Some video coding families provide support for scalability in separated profile(s) from the profile(s) for single-layer coding. Scalable video coding (SVC) is a scalable extension of the advanced video coding (AVC) that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC may not directly reuse unmodified AVC implementations in their design. The SVC EL macroblock syntax and decoding process differs from the AVC syntax and decoding process.

Scalable HEVC (SHVC) is an extension of HEVC that provides support for spatial and quality scalabilities. Multiview HEVC (MV-HEVC) is an extension of HEVC that provides support for multi-view scalability. 3D HEVC (3D-HEVC) is an extension of HEVC that provides support for 3D video coding that is more advanced and more efficient than MV-HEVC. Temporal scalability may be included as an integral part of a single-layer HEVC codec. In the multi-layer extension of HEVC, decoded pictures used for inter-layer prediction come only from the same AU and are treated as long-term reference pictures (LTRPs). Such pictures are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s). Spatial scalability resamples a reference picture or part thereof when an ILRP has a different spatial resolution than the current picture being encoded or decoded. Reference picture resampling can be realized at either picture level or coding block level.

VVC may also support layered video coding. A VVC bitstream can include multiple layers. The layers can be all independent from each other. For example, each layer can be coded without using inter-layer prediction. In this case, the layers are also referred to as simulcast layers. In some cases, some of the layers are coded using ILP. A flag in the VPS can indicate whether the layers are simulcast layers or whether some layers use ILP. When some layers use ILP, the layer dependency relationship among layers is also signaled in the VPS. Unlike SHVC and MV-HEVC, VVC may not specify OLSs. An OLS includes a specified set of layers, where one or more layers in the set of layers are specified to be output layers. An output layer is a layer of an OLS that is output. In some implementations of VVC, only one layer may be selected for decoding and output when the layers are simulcast layers. In some implementations of VVC, the entire bitstream including all layers is specified to be decoded when any layer uses ILP. Further, certain layers among the layers are specified to be output layers. The output layers may be indicated to be only the highest layer, all the layers, or the highest layer plus a set of indicated lower layers.

The preceding aspects contain certain scalability related problems. The scalability design in such systems includes layer-specific profile, tier, and level (PTL), as well as layer-specific coded picture buffer (CPB) operations. The PTL signaling efficiency should be improved. The signaling efficiency for sequence-level HRD parameters for sub-layers should be improved. The DPB parameters signaling should be improved. Some designs cause single-layer bitstreams to refer to VPSs. The value range of the num_ref_entries[ ][ ] in such designs is incorrect and causes unexpected errors for decoders. The decoding process in such designs involves sub-bitstream extraction, which adds a burden to decoder implementations. The general decoding process for such designs may not work for scalable bitstreams containing multiple layers with inter-layer prediction. The derivation of the value of the variable NoOutputOfPriorPicsFlag in such designs may be picture based and not AU based in such designs. The scalable nesting SEI message in such designs should be simplified to directly apply to OLSs, instead of layers of OLSs, when nesting_ols_flag is equal to one. A non-scalable-nested SEI message, when payloadType is equal to zero (buffering period), one (picture timing), or one hundred thirty (decoding unit information), may be specified to apply only to the 0-th OLS.

In general, this disclosure describes various approaches for scalability in video coding. The descriptions of the techniques are based on VVC. However, the techniques also apply to layered video coding based on other video codec specifications. One or more of the abovementioned problems may be solved as follows. Specifically, this disclosure includes methods for improved scalability support in video coding.

The following are various example definitions. An OP may be a temporal subset of an OLS, identified by an OLS index and a highest value of TemporalId. An output layer may be a layer of an OLS that is output. An OLS may be a set of layers, where one or more layers in the set of layers are specified to be output layers. An OLS layer index may be an index, of a layer in an OLS, to the list of layers in the OLS. A sub-bitstream extraction process may be a specified process by which NAL units in a bitstream that do not belong to a target set, determined by a target OLS index and a target highest TemporalId, are removed from the bitstream, with the output sub-bitstream comprising the NAL units in the bitstream that belong to the target set.

An example video parameter set RBSP syntax is as follows.

| video_parameter_set_rbsp( ) { | Descriptor |
|---|---|
| vps_video_parameter_set_id | u(4) |
| vps_max_layers_minus1 | u(6) |
| vps_max_sub_layers_minus1 | u(3) |
| if( vps_max_layers_minus1 > 0 && vps_max_sub_layers_minus1 > 0 ) | |
|     vps_all_layers_same_num_sub_layers_flag | u(1) |
| if( vps_max_layers_minus1 > 0 ) | |
|     vps_all_independent_layers_flag | u(1) |
| ... | |
| vps_num_ptls | u(8) |
| for( i = 0; i < vps_num_ptls; i++ ) { | |
|     if( i > 0 ) | |
|         pt_present_flag[ i ] | u(1) |
|     if( vps_max_sub_layers_minus1 > 0 && !vps_all_layers_same_num_sub_layers_flag ) | |
|         ptl_max_temporal_id[ i ] | u(3) |
| } | |
| while( !byte_aligned( ) ) | |
|     vps_ptl_byte_alignment_zero_bit /* equal to 0 */ | u(1) |
| for( i = 0; i < vps_num_ptls; i++ ) | |
|     profile_tier_level( pt_present_flag[ i ], ptl_max_temporal_id[ i ] ) | |
| for( i = 0; i < TotalNumOlss; i++ ) | |
|     if( NumLayersInOls[ i ] > 1 && vps_num_ptls > 1 ) | |
|         ols_ptl_idx[ i ] | u(8) |
| if( !vps_all_independent_layers_flag ) | |
|     vps_num_dpb_params | ue(v) |
| if( vps_num_dpb_params > 0 ) { | |
|     same_dpb_size_output_or_nonoutput_flag | u(1) |
|     if( vps_max_sub_layers_minus1 > 0 ) | |
|         vps_sub_layer_dpb_params_present_flag | u(1) |
| } | |
| for( i = 0; i < vps_num_dpb_params; i++ ) { | |
|     dpb_size_only_flag[ i ] | u(1) |
|     if( vps_max_sub_layers_minus1 > 0 && !vps_all_layers_same_num_sub_layers_flag ) | |
|         dpb_max_temporal_id[ i ] | u(3) |
|     dpb_parameters( dpb_size_only_flag[ i ], dpb_max_temporal_id[ i ], vps_sub_layer_dpb_params_present_flag ) | |
| } | |
| for( i = 0; i < vps_max_layers_minus1 && vps_num_dpb_params > 1; i++ ) { | |
|     if( !vps_independent_layer_flag[ i ] ) | |
|         layer_output_dpb_params_idx[ i ] | ue(v) |
|     if( LayerUsedAsRefLayerFlag[ i ] && !same_dpb_size_output_or_nonoutput_flag ) | |
|         layer_nonoutput_dpb_params_idx[ i ] | ue(v) |
| } | |

| video_parameter_set_rbsp( ) { | Descriptor |
|---|---|
|   general_hrd_params_present_flag | u(1) |
|   if( general_hrd_params_present_flag ) { | |
|     num_units_in_tick | u(32) |
|     time_scale | u(32) |
|     general_hrd_parameters( ) | |
|   } | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

An example sequence parameter set RBSP syntax is as follows.

| seq_parameter_set_rbsp( ) { | Descriptor |
|---|---|
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   sps_ptl_dpb_present_flag | u(1) |
|   if( sps_ptl_dpb_present_flag ) | |
|     profile_tier_level( 1, sps_max_sub_layers_minus1 ) | |
|   gdr_enabled_flag | u(1) |
|   sps_seq_parameter_set_id | ue(v) |
|   chroma_format_idc | ue(v) |
|   ... | |
|   log2_max_pic_order_cnt_lsb_minus4 | ue(v) |
|   poc_msb_in_rap_pics_flag | u(1) |
|   if( poc_msb_in_rap_pics_flag > 0 ) | |
|     poc_msb_len_minus1 | ue(v) |
|   if( sps_max_sub_layers_minus1 > 0 ) | |
|     sps_sub_layer_dpb_params_flag | u(1) |
|   if( sps_ptl_dpb_present_flag ) | |
|     dpb_parameters( 0, sps_max_sub_layers_minus1, sps_sub_layer_dpb_params_flag ) | |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   ... | |
|   sps_scaling_list_enabled_flag | u(1) |
|   general_hrd_parameters_present_flag | u(1) |
|   if( general_hrd_parameters_present_flag ) { | |
|     num_units_in_tick | u(32) |
|     time_scale | u(32) |
|     sub_layer_cpb_parameters_present_flag | u(1) |
|     if( sub_layer_cpb_parameters_present_flag ) | |
|       general_hrd_parameters( 0, sps_max_sub_layers_minus1 ) | |
|     else | |
|     general_hrd_parameters( sps_max_sub_layers_minus1, sps_max_sub_layers_minus1 ) | |
|   } | |
|   vui_parameters_present_flag | u(1) |
|   if( vui_parameters_present_flag ) | |
|     vui_parameters( ) | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

An example DPB parameters syntax is as follows.

| dpb_parameters( dpbSizeOnlyFlag, maxSubLayersMinus1, subLayerInfoFlag ) { | Descriptor |
|---|---|
| for( i = ( subLayerInfoFlag ? 0 : maxSubLayersMinus1 ); i <= maxSubLayersMinus1; i++ ) { | |
|   max_dec_pic_buffering_minus1[ i ] | ue(v) |
|   if( !dpbSizeOnlyFlag ) { | |
|     max_num_reorder_pics[ i ] | ue(v) |
|     max_latency_increase_plus1[ i ] | ue(v) |
|   } | |
| } | |
| } | |

An example general HRD parameters syntax is as follows.

| general_hrd_parameters( ) { | Descriptor |
|---|---|
|   general_nal_hrd_params_present_flag | u(1) |
|   general_vcl_hrd_params_present_flag | u(1) |
|   if( general_nal_hrd_params_present_flag \|\| general_vcl_hrd_params_present_flag ) { | |
|     decoding_unit_hrd_params_present_flag | u(1) |
|     if( decoding_unit_hrd_params_present_flag ) { | |
|       tick_divisor_minus2 | u(8) |
|       decoding_unit_cpb_params_in_pic_timing_sei_flag | u(1) |
|     } | |
|     bit_rate_scale | u(4) |
|     cpb_size_scale | u(4) |
|     if( decoding_unit_hrd_params_present_flag ) | |
|       cpb_size_du_scale | u(4) |
|   } | |
|   if( vps_max_sub_layers_minus1 > 0 ) | |
|     sub_layer_cpb_params_present_flag | u(1) |
|   if( TotalNumOlss > 1 ) | |
|     num_ols_hrd_params_minus1 | ue(v) |
|   hrd_cpb_cnt_minus1 | ue(v) |
|   for( i = 0; i <= num_ols_hrd_params_minus1; i++ ) { | |
|     if( vps_max_sub_layers_minus1 > 0 && !vps_all_layers_same_num_sub_layers_flag ) | |
|       hrd_max_temporal_id[ i ] | u(3) |
|     ols_hrd_parameters( hrd_max_temporal_id[ i ] ) | |
|   } | |
|   if( num_ols_hrd_params_minus1 > 0 ) | |
|     for( i = 1; i < TotalNumOlss; i++ ) | |
|       ols_hrd_idx[ i ] | ue(v) |
| } | |

An example OLS HRD parameters syntax is as follows.

| ols_hrd_parameters( hrdMaxTid ) { | Descriptor |
|---|---|
|   firstSubLayer = sub_layer_cpb_params_present_flag ? 0 : hrdMaxTid | |
|   for( i = firstSubLayer; i <= hrdMaxTid; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else if( hrd_cpb_cnt_minus1 = = 0 ) | |
|       low_delay_hrd_flag[ i ] | u(1) |
|     if( general_nal_hrd_params_present_flag ) | |
|       sub_layer_hrd_parameters( i ) | |
|     if( general_vcl_hrd_params_present_flag ) | |
|       sub_layer_hrd_parameters( i ) | |
|   } | |
| } | |

An example sub-layer HRD parameters syntax is as follows.

| sub_layer_hrd_parameters( subLayerId ) { | Descriptor |
|---|---|
|   for( j = 0; j <= hrd_cpb_cnt_minus1; j++ ) { | |
|     bit_rate_value_minus1[ subLayerId ][ j ] | ue(v) |
|     cpb_size_value_minus1[ subLayerId ][ j ] | ue(v) |
|     if( decoding_unit_hrd_params_present_flag ) { | |
|       cpb_size_du_value_minus1[ subLayerId ][ j ] | ue(v) |
|       bit_rate_du_value_minus1[ subLayerId ][ j ] | ue(v) |
|     } | |
|     cbr_flag[ subLayerId ][ j ] | u(1) |
|   } | |
| } | |

An example video parameter set RBSP semantics is as follows. A vps_max_layers_minus1 plus 1 specifies the maximum allowed number of layers in each CVS referring to the VPS. A vps_max_sub_layers_minus1 plus 1 specifies the maximum number of temporal sub-layers that may be present in each CVS referring to the VPS. The value of vps_max_sub_layers_minus1 may be in the range of zero to six, inclusive. A vps_all_layers_same_num_sub_layers_flag equal to one specifies that the number of temporal sub-layers is the same for all the layers in each CVS referring to the VPS. A vps_all_layers_same_num_sub_layers_flag equal to zero specifies that the layers in each CVS referring to the VPS may or may not have the same number of temporal sub-layers. When not present, the value of vps_all_layers_same_numsub_layers_flag may be inferred to be equal to one. A vps_all_independent_layers_flag equal to one specifies that all layers in the CVS are independently coded without using inter-layer prediction. A vps_all_independent_layers_flag equal to zero specifies that one or more of the layers in the CVS may use inter-layer prediction. When not present, the value of vps_all_independent_layers_flag may be inferred to be equal to one. When vps_all_independent_layers_flag is equal to one, the value of vps_independent_layer_flag[i] is inferred to be equal to one. When vps_all_independent_layers_flag is equal to zero, the value of vps_independent_layer_flag[0] is inferred to be equal to one.

A vps_direct_dependency_flag[i][j] equal to zero specifies that the layer with index j is not a direct reference layer for the layer with index i. A vps_direct_dependency_flag[i][j] equal to one specifies that the layer with index j is a direct reference layer for the layer with index i. When vps_direct_dependency_flag [i][j] is not present for i and j in

```
if( vps_max_layers_minus1 = = 0 )
   TotalNumOlss = 1
else if( each_layer_is_an_ols_flag | | ols_mode_idc = = 0 | | ols_mode_idc = = 1 )
   TotalNumOlss = vps_max_layers_minus1 + 1
else if( ols_mode_idc = = 2 )
   TotalNumOlss = num_output_layer_sets_minus1 + 1
``` the range of zero to vps_max_layers_minus1, inclusive, the flag is inferred to be equal to zero. The variable DirectDependentLayerIdx[i][j], specifying the j-th direct dependent layer of the i-th layer, and the variable LayerUsedAsRefLayerFlag[j], specifying whether the layer with layer index j is used as a reference layer by any other layer, may be derived as follows:

```
for( i = 0; i <= vps_max_layers_minus1; i++ )
   LayerUsedAsRefLayerFlag[ j ] = 0
for( i = 1; i < vps_max_layers_minus1; i++ )
   if( !vps_independent_layer_flag[ i ] )
      for( j = i − 1, k = 0; j >= 0; j−− )
         if( vps_direct_dependency_flag[ i ][ j ] ) {
            DirectDependentLayerIdx[ i ][ k++ ] = j
            LayerUsedAsRefLayerFlag[ j ] = 1
         }
```

The variable GeneralLayerIdx[i], specifying the layer index of the layer with nuh_layer_id equal to vps_layer_id [i], may be derived as follows.

```
for( i = 0; i <= vps_max_layers_minus1; i++ )
   GeneralLayerIdx[ vps_layer_id[ i ] ] = i
```

An each_layer_is_an_ols_flag equal to one specifies that each output layer set contains only one layer and each layer itself in the bitstream is an output layer set with the single included layer being the only output layer. An each_layer_is_an_ols_flag equal to zero specifies that an output layer set may contain more than one layer. If vps_max_layers_minus1 is equal to zero, the value of the each_layer_is_an_ols_flag is inferred to be equal to one. Otherwise, when vps_all_independent_layers_flag is equal to zero, the value of each_layer_is_an_ols_flag is inferred to be equal to zero.

An ols_mode_idc equal to zero specifies that the total number of OLSs specified by the VPS is equal to vps_max_layers_minus1+1, the i-th OLS includes the layers with layer indices from zero to i, inclusive, and for each OLS only the highest layer in the OLS is output. An ols_mode_idc equal to one specifies that the total number of OLSs specified by the VPS is equal to vps_max_layers_minus1+1, the i-th OLS includes the layers with layer indices from zero to i, inclusive, and for each OLS all layers in the OLS are output. An ols_mode_idc equal to two specifies that the total number of OLSs specified by the VPS is explicitly signaled and for each OLS the highest layer and an explicitly signaled set of lower layers in the OLS are output. The value of ols_mode_idc may be in a range of zero to two, inclusive. When vps_all_independent_layers_flag is equal to one and each_layer_is_an_ols_flag is equal to zero, the value of ols_mode_idc is inferred to be equal to two. A num_output_layer_sets_minus1 plus 1 specifies the total number of OLSs specified by the VPS when ols_mode_idc is equal to two.

The variable TotalNumOlss, specifying the total number of OLSs specified by the VPS, may be derived as follows:

A layer_included_flag[i][j] specifies whether the j-th layer (e.g., the layer with nuh_layer_id equal to vps_layer_id[j]) is included in the i-th OLS when ols_mode_idc is equal to two. A layer_included_flag[i][j] equal to one specifies that the j-th layer is included in the i-th OLS. A layer_included_flag[i][j] equal to zero specifies the j-th layer is not included in the i-th OLS. The variable NumLayersInOls[i], specifying the number of layers in the i-th OLS, and the variable LayerIdInOls[i][j], specifying the nuh_layer_id value of the j-th layer in the i-th OLS, may be derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
   if( each_layer_is_an_ols_flag ) {
      NumLayersInOls[ i ] = 1
      LayerIdInOls[ i ][ 0 ] = vps_layer_id[ i ]
   } else if( ols_mode_idc == 0 | | ols_mode_idc == 1 ) {
      NumLayersInOls[ i ] = i + 1
      for( j = 0; j < NumLayersInOls[ i ]; j++ )
         LayerIdInOls[ i ][ j ] = vps_layer_id[ j ]
   } else if( ols_mode_idc == 2 ) {
      for( k = 0, j = 0; k <= vps_max_layers_minus1; k++ )
         if( layer_included_flag[ i ][ k ] )
            LayerIdInOls[ i ][ j++ ] =
               vps_layer_id[ k ]
      NumLayersInOls[ i ] = j
   }
}
```

The variable OlsLayeIdx[i][j], specifying the OLS layer index of the layer with nuh_layer_id equal to LayerIdInOls[i][j], may be derived as follows:

```
for( i = 0, i < TotalNumOlss; i++ )
   for j = 0; j < NumLayersInOls[ i ]; j++ )
      OlsLayeIdx[ i ][ LayerIdInOls[ i ][ j ] ] = j
```

The lowest layer in each OLS shall be an independent layer. In other words, for each i in the range of zero to TotalNumOlss−1, inclusive, the value of vps_independent_layer_flag[GeneralLayerIdx[LayerIdInOls[i][0]]] shall be equal to one. Each layer should be included in at least one OLS specified by the VPS. In other words, for each layer with a particular value of nuh_layer_id nuhLayerId, equal to one of vps_layer_id[k] for k in the range of zero to vps_max_layers_minus1, inclusive, there shall be at least one pair of values of i and j, where i is in the range of zero to TotalNumOlss−1, inclusive, and j is in the range of NumLayersInOls[i]−1, inclusive, such that the value of LayerIdInOls[i][j] is equal to nuhLayerId. Any layer in an OLS shall be an output layer of the OLS or a (direct or indirect) reference layer of an output layer of the OLS.

A vps_output_layer_flag[i][j] specifies whether the j-th layer in the i-th OLS is output when ols_mode_idc is equal to two. A vps_output_layer_flag[i] equal to one specifies that the j-th layer in the i-th OLS is output. A vps_output_layer_flag[i] equal to zero specifies that the j-th layer in the i-th OLS is not output. When vps_all_independent_layers_flag is equal to one and each_layer_is_an_ols_flag is equal to zero, the value of vps_output_layer_flag[i] is inferred to be equal to one. The variable OutputLayerFlag[i][j], for which the value one specifies that the j-th layer in the i-th OLS is output and the value zero specifies that the j-th layer in the i-th OLS is not output, may be derived as follows.

```
for( i = 0, i < TotalNumOlss; i++ ) {
    OutputLayerFlag[ i ][ NumLayersInOls[ i ] − 1 ] = 1
    for( j = 0; j < NumLayersInOls[ i ] − 1; j++ )
        if( ols_mode_idc[ i ] == 0 )
            OutputLayerFlag[ i ][ j ] = 0
        else if( ols_mode_idc[ i ] == 1 )
            OutputLayerFlag[ i ][ j ] = 1
        else if( ols_mode_idc[ i ] == 2 )
            OutputLayerFlag[ i ][ j ] = vps_output_layer_flag[ i ][ j ]
}
```

It should be noted that a 0-th OLS contains only the lowest layer (e.g., the layer with nuh_layer_id_equal to vps_layer_id[0]) and for the 0-th OLS the only included layer is output. A vps_num_ptls specifies the number of profile_tier_level( ) syntax structures in the VPS. A pt_present_flag[i] equal to one specifies that profile, tier, and general constraints information are present in the i-th profile_tier_level( ) syntax structure in the VPS. A pt_present_flag[i] equal to zero specifies that profile, tier, and general constraints information are not present in the i-th profile_tier_level( ) syntax structure in the VPS. The value of pt_present_flag[0] is inferred to be equal to zero. When pt_present_flag[i] is equal to zero, the profile, tier, and general constraints information for the i-th profile_tier_level ( ) syntax structure in the VPS are inferred to be the same as that for the (i−1)-th profile_tier_level( ) syntax structure in the VPS.

A ptl_max_temporal_id[i] specifies the TemporalId of the highest sub-layer representation for which the level information is present in the i-th profile_tier_level( ) syntax structure in the VPS. The value of ptl_max_temporal_id[i] shall be in the range of zero to vps_max_sub_layers_minus1, inclusive. When vps_max_sub_layers_minus1 is equal to zero, the value of ptl_max_temporal_id[i] is inferred to be equal to zero. When vsp_max_sub_layers_minus1 is greater than zero and vps_all_layers_same_num_sub_layers_flag is equal to one, the value of ptl_max_temporal_id[i] is inferred to be equal to vps_max_sub_layers_minus1. A vps_ptl_byte_alignment_zero_bit should be equal to zero.

An ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] should be in the range of zero to vps_num_ptls−1, inclusive. When NumLayersInOls[i] is equal to one, the profile_tier_level( ) syntax structure that applies to the i-th OLS is present in the SPS referred to by the layer in the i-th OLS. A vps_num_dpb_params specifies the number of dpb_parameters( ) syntax structures in the VPS. The value of vps_num_dpb_params shall be in the range of zero to sixteen, inclusive. When not present, the value of vps_num_dpb_params may be inferred to be equal to zero. A same_dpb_size_output_or_nonoutput_flag equal to one specifies that there is no layer_nonoutput_dpb_params_idx [i] syntax element present in the VPS. A same_dpb_size_output_or_nonoutput_flag equal to zero specifies that there may or may not be layer_nonoutput_dpb_params_idx[i] syntax elements present in the VPS. A vps_sub_layer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to zero.

A dpb_size_only_flag[ i] equal to one specifies that the max_num_reorder_pics[ ] and max_latency_increase_plus1[ ] syntax elements are not present in the i-th dpb_parameters( ) syntax structures the VPS. A dpb_size_only_flag[i] equal to one specifies that the max_num_reorder_pics[ ] and max_latency_increase_plus1[ ] syntax elements may be present in the i-th dpb_parameters( ) syntax structures the VPS. A dpb_max_temporal_id[i] specifies the TemporalId of the highest sub-layer representation for which the DPB parameters may be present in the i-th dpb_parameters( ) syntax structure in the VPS. The value of dpb_max_temporal_id[i] shall be in the range of zero to vps_max_sub_layers_minus1, inclusive. When vps_max_sub_layers_minus1 is equal to zero, the value of dpb_max_temporal_id[i] may be inferred to be equal to zero. When vps_max_sub_layers_minus1 is greater than zero and vps_all_layers_same_num_sub_layers_flag is equal to one, the value of dpb_max_temporal_id[i] is inferred to be equal to vps_max_sub_layers_minus1. A layer_output_dpb_params_idx[i] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[i] shall be in the range of zero to vps_num_dpb_params−1, inclusive.

If vps_independent_layer_flag[i] is equal to one, the dpb_parameters( ) syntax structure that applies to the i-th layer when it is an output layer is the dpb_parameters( ) syntax structure present in the SPS referred to by the layer. Otherwise (vps_independent_layer_flag[i] is equal to one), the following applies. When vps_num_dpb_params is equal to one, the value of layer_output_dpb_params_idx[i] is inferred to be equal to zero. Bitstream conformance may require that the value of layer_output_dpb_params_idx[i] be such that dpb_size_only_flag[layer_output_dpb_params_idx[i]] is equal to zero.

A layer_nonoutput_dpb_params_idx[i] specifies the index, to the list of dpb_parameters( ) syntax structures in the VPS, of the dpb_parameters( ) syntax structure that applies to the i-th layer when the i-th layer is a non-output layer in an OLS. When present, the value of layer_nonoutput_dpb_params_idx[i] should be in the range of zero to vps_num_dpb_params−1, inclusive. If same_dpb_size_output_or_nonoutput_flag is equal to 1, the following applies. If vps_independent_layer_flag[i] is equal to one, the dpb_parameters( ) syntax structure that applies to the i-th layer when the i-th layer is a non-output layer is the dpb_parameters( ) syntax structure present in the SPS referred to by the layer. Otherwise (vps_independent_layer_flag[i] is equal to one), the value of layer_nonoutput_dpb_params_idx[i] is inferred to be equal to layer_output_dpb_params_idx[i]. Otherwise (same_dpb_size_output_or_nonoutput_flag is equal to zero), when vps_num_dpb_params is equal to one, the value of layer_output_dpb_params_idx[i] is inferred to be equal to zero.

A general_hrd_params_present_flag equal to one specifies that the syntax elements num_units_in_tick and time_scale and the syntax structure general_hrd_parameters( ) are present in the SPS RBSP syntax structure. A general_hrd_params_present_flag equal to zero specifies that the syntax elements num_units_in_tick and time_scale and the syntax structure general_hrd_parameters( ) are not present in the SPS RBSP syntax structure. A num_units_in_tick is the number of time units of a clock operating at the frequency time_scale hertz (Hz) that corresponds to one increment (called a clock tick) of a clock tick counter. A num_units_in_tick shall be greater than zero. A clock tick, in units of seconds, is equal to the quotient of num_units_in_tick divided by time_scale. For example, when the picture rate of a video signal is twenty five Hz, time_scale may be equal to 27,000,000 and num_units_in_tick may be equal to 1,080,000, and consequently a clock tick may be equal to 0.04 seconds. A time_scale is the number of time units that pass in one second. For example, a time coordinate system that measures time using a 27 MHz clock has a time_scale of 27,000,000. The value of time_scale shall be greater than zero.

A vps_extension_flag equal to zero specifies that no vps_extension_data_flag syntax elements are present in the VPS RBSP syntax structure. A vps_extension_flag equal to one specifies that there are vps_extension_data_flag syntax elements present in the VPS RBSP syntax structure. A vps_extension_data_flag may have any value. The presence and value of vps_extension_data_flag may not affect decoder conformance to profiles. Conforming decoders may ignore all vps_extension_data_flag syntax elements.

An example sequence parameter set RBSP semantics are as follows. An SPS RBSP should be available to the decoding process prior to being referenced, included in at least one access unit with TemporalId equal to zero, or provided through external means, and the SPS NAL unit containing the SPS RBSP shall have nuh_layer_id equal to the lowest nuh_layer_id value of PPS NAL units that refer to the SPS NAL unit. All SPS NAL units with a particular value of sps_seq_parameter_set_id in a CVS should have the same content. A sps_decoding_parameter_set_id, when greater than zero, specifies the value of dps_decoding_parameter_set_id for the DPS referred to by the SPS. When sps_decoding_parameter_set_id is equal to zero, the SPS does not refer to a DPS and no DPS is referred to when decoding each CLVS referring to the SPS. The value of sps_decoding_parameter_set_id should be the same in all SPSs that are referred to by coded pictures in a bitstream.

A sps_video_parameter_set_id, when greater than zero, specifies the value of vps_video_parameter_set_id for the VPS referred to by the SPS. When sps_video_parameter_set_id is equal to zero, the SPS may not refer to a VPS and no VPS is referred to when decoding each CLVS referring to the SPS, and the value of GeneralLayerIdx[nuh_layer_id] should be inferred to be equal to zero, and the value of vps_independent_layer_flag[GeneralLayerIdx[nuh_layer_id]] may be inferred to be equal to one. When vps_independent_layer_flag[GeneralLayerIdx[nuh_layer_id]] is equal to one, the SPS referred to by a CLVS with a particular nuh_layer_id value nuhLayerId shall have nuh_layer_id equal to nuhLayerId.

A sps_max_sub_layers_minus1 plus 1 specifies the maximum number of temporal sub-layers that may be present in each CLVS referring to the SPS. The value of sps_max_sub_layers_minus1 should be in the range of zero to vps_max_sub_layers_minus1, inclusive. A sps_reserved_zero_4 bits should be equal to zero in conforming bitstreams. Other values for sps_reserved_zero_4 bits may be reserved.

A sps_ptl_dpb_present_flag equal to one specifies that a profile_tier_level( ) syntax structure and a dpb_parameters( ) syntax structure are present in the SPS. A sps_ptl_dpb_present_flag equal to zero specifies that no profile_tier_level( ) syntax structure and no dpb_parameters( ) syntax structure are present in the SPS. The value of sps_ptl_dpb_present_flag should be equal to vps_independent_layer_flag[nuh_layer_id]. If vps_independent_layer_flag[GeneralLayerIdx[nuh_layer_id]] is equal to one, the variable max_DecPicBuffMinus1 is set equal to max_dec_pic_buffering_minus1[sps_max_sub_layers_minus1] in the dpb_parameters( ) syntax structure in the SPS. Otherwise, MaxDecPicBuffMinus1 is set equal to max_dec_pic_buffering_minus1[sps_max_sub_layers_minus1] in the layer_nonoutput_dpb_params_idx[GeneralLayerIdx[nuh_layer_id]]-th dpb_parameters( ) syntax structure in the VPS. A gdr_enabled_flag equal to one specifies that GDR pictures may be present in CLVSs referring to the SPS. A gdr_enabled_flag equal to zero specifies that GDR pictures are not present in CLVSs referring to the SPS.

A sps_sub_layer_dpb_params_flag is used to control the presence of max_dec_pic_buffering_minus1[i], max_num_reorder_pics[i], and max_latency_increase_plus1[i] syntax elements in the dpb_parameters( ) syntax in the SPS. When not present, sps_sub_dpb_params_info_present_flag is inferred to be equal to zero. A long_term_ref_pics_flag equal to zero specifies that no LTRP is used for inter prediction of any coded picture in the CLVS. A long_term_ref_pics_flag equal to one specifies that LTRPs may be used for inter prediction of one or more coded pictures in the CLVS.

An example general profile, tier, and level semantics is as follows. A profile_tier_level( ) syntax structure provides level information and, optionally, profile, tier, sub-profile, and general constraints information (denoted as PT information). When the profile_tier_level( ) syntax structure is included in a DPS, the OlsInScope is the OLS that includes all layers in the entire bitstream that refers to the DPS. When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, which should be an independent layer.

A general_profile_idc indicates a profile to which OlsInScope conforms. A general_tier_flag specifies the tier context for the interpretation of general_level_idc. A num_sub_profiles specifies the number of the general_sub_profile_idc[i] syntax elements. A general_sub_profile_idc[i] indicates the i-th interoperability metadata registered. A general_level_idc indicates a level to which OlsInScope conforms. It should be noted that a greater value of general_level_idc indicates a higher level. The maximum level signaled in the DPS for OlsInScope may be higher than the level signaled in the SPS for a CVS contained within OlsInScope. It should also be noted that when OlsInScope conforms to multiple profiles, general_profile_idc should indicate the profile that provides the preferred decoded result or the preferred bitstream identification, as determined by the encoder. In should also be noted that when the profile_tier_level( ) syntax structure is included in a DPS and CVSs of OlsInScope conform to different profiles, general_profile_idc and level_idc should indicate the profile and level for a decoder that is capable of decoding OlsInScope.

A sub_layer_level_present_flag[i] equal to one specifies that level information is present in the profile_tier_level( ) syntax structure for the sub-layer representation with TemporalId equal to i. A sub layer_level_present_flag[i] equal to zero specifies that level information is not present in the profile_tier_level( ) syntax structure for the sub-layer representation with TemporalId equal to i. A ptl_alignment_zero_bits should be equal to zero. The semantics of the syntax element sub_layer_level_idc[i] is, apart from the specification of the inference of not present values, the same as the syntax element general_level_idc, but apply to the sub-layer representation with TemporalId equal to i.

An example DPB parameters semantics is as follows. The dpb_parameters(maxSubLayersMinus1, subLayerInfoFlag) syntax structure provides information of DPB size, maximum picture reorder number, and maximum latency for each CLVS of the CVS. When a dpb_parameters( ) syntax structure is included in a VPS, the OLSs to which the dpb_parameters( ) syntax structure applies are specified by the VPS. When a dpb_parameters( ) syntax structure is included in an SPS, the dpb_parameters( ) syntax structure applies to the OLS that includes only the layer that is the lowest layer among the layers that refer to the SPS, which shall be an independent layer.

A max_dec_pic_buffering_minus1[i] plus 1 specifies, for each for each CLVS of the CVS, the maximum required size of the decoded picture buffer in units of picture storage buffers when Htid is equal to i. The value of max_dec_pic_buffering_minus1[i] should be in the range of 0 to MaxDpbSize−1, inclusive. When i is greater than zero, max_dec_pic_buffering_minus1[i] should be greater than or equal to max_dec_pic_buffering_minus1[i−1]. When max_dec_pic_buffering_minus1[i] is not present for i in the range of zero to maxSubLayersMinus1−1, inclusive, due to subLayerInfoFlag being equal to zero, max_dec_pic_buffering_minus1l[i] is inferred to be equal to max_dec_pic_buffering_minus1[maxSubLayersMinus1].

A max_num_reorder_pics[i] specifies, for each CLVS of the CVS, the maximum allowed number of pictures of the CLVS that can precede any picture in the CLVS in decoding order and follow that picture in output order when Htid is equal to i. The value of max_num_reorder_pics[i] should be in the range of zero to max_dec_pic_buffering_minus1[i], inclusive. When i is greater than zero, max-num_reorder_pics[i] should be greater than or equal to max_num_reorder_pics[i−1]. When max_num_reorder_pics[i] is not present for i in the range of zero to max_SubLayersMinus1−1, inclusive, due to subLayerInfoFlag being equal to zero, max_num_reorder_pics[i] is inferred to be equal to max_num_reorder_pics[maxSubLayersMinus1].

A max_latency_increase_plus1[i] not equal to zero is used to compute the value of MaxLatencyPictures[i], which specifies, for each CLVS of the CVS, the maximum number of pictures in the CLVS that can precede any picture in the CLVS in output order and follow that picture in decoding order when Htid is equal to i. When max_latency_increase_plus1[i] is not equal to zero, the value of MaxLatencyPictures[i] may be specified as follows. MaxLatencyPictures[i]=max_num_reorder_pics[i]+max_latency_increase_plus1[i]−1 When max_latency_increase_plus1[i] is equal to 0, no corresponding limit is expressed.

The value of max_latency_increase_plus1[i] should be in the range of zero to two hundred thirty two minus two, inclusive. When max_latency_increase_plus1[i] is not present for i in the range of zero to maxSubLayersMinus1−1, inclusive, due to subLayerInfoFlag being equal to zero, max_latency_increase_plus1[i] is inferred to be equal to max_latency_increase_plus1[maxSubLayersMinus1].

An example general HRD parameters semantics is as follows. The general_hrd_parameters( ) syntax structure provides HRD parameters used in the HRD operations. A num_ols_hrd_params_minus1 plus 1 specifies the number of ols_hrd_parameters( ) syntax structures present in the general_hrd_parameters( ) syntax structure. The value of num_ols_hrd_params_minus1 should be in the range of zero to sixty three, inclusive. When TotalNumOlss is greater than one, the value of num_ols_hrd_params_minus1 is inferred to be equal to zero. The hrd_cpb_cnt_minus1 plus 1 specifies the number of alternative CPB specifications in the bitstream of the CVS. The value of hrd_cpb_cnt_minus1 should be in the range of zero to thirty one, inclusive. A hrd_max_temporal_id[i] specifies the TemporalId of the highest sub-layer representation for which the HRD parameters are contained in the i-th layer_level_hrd_parameters( ) syntax structure. The value of hrd_max_temporal_id[i] should be in the range of zero to vps_max_sub_layers_minus1, inclusive. When vps_max_sub_layers_minus1 is equal to zero, the value of hrd_max_temporal_id[i] is inferred to be equal to zero. A ols_hrd_idx[i] specifies the index of the ols_hrd_parameters( ) syntax structure that applies to the i-th OLS. The value of ols_hrd_idx[[i] should be in the range of zero to num_ols_hrd_params_minus1, inclusive. When not present, the value of ols_hrd_idx[[i] is inferred to be equal to zero.

An example reference picture list structure semantics is as follows. The ref_pic_list_struct(listIdx, rplsIdx) syntax structure may be present in an SPS or in a slice header. Depending on whether the syntax structure is included in a slice header or an SPS, the following applies. If present in a slice header, the ref_pic_list_struct(listIdx, rplsIdx) syntax structure specifies reference picture list listIdx of the current picture (the picture containing the slice). Otherwise (present in an SPS), the ref_pic_list_struct(listIdx, rplsIdx) syntax structure specifies a candidate for reference picture list listIdx, and the term the current picture in the semantics specified in the remainder of this clause refers to each picture that has one or more slices containing ref_pic_list_idx[listIdx] equal to an index into the list of the ref_pic_list_struct(listIdx, rplsIdx) syntax structures included in the SPS, and is in a CVS that refers to the SPS. A num_ref_entries[listIdx][rplsIdx] specifies the number of entries in the ref_pic_list_struct(listIdx, rplsIdx) syntax structure. The value of num_ref_entries[listIdx][rplIdx] should be in the range of zero to MaxDecPicBuffMinus1 +fourteen, inclusive.

An example general decoding process is as follows. Input to this process is a bitstream BitstreamToDecode. Output of this process is a list of decoded pictures. The decoding process is specified such that all decoders that conform to a specified profile and level produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements.

For each IRAP AU in the bitstream, the following applies. If the AU is the first AU in the bitstream in decoding order, each picture is an instantaneous decoding refresh (IDR) picture, or each picture is the first picture of the layer that follows an end of sequence NAL unit in decoding order, the variable NoIncorrectPicOutputFlag is set equal to one. Otherwise, if the variable HandleCraAsCvsStartFlag is set to a value for the AU, HandleCraAsCvsStartFlag is set equal a value provided by tan external mechanism and NoIncorrectPicOutputFlag is set equal to HandleCraAsCvsStartFlag.

Otherwise, HandleCraAsCvsStartFlag and NoIncorrectPicOutputFlag are both set equal to zero.

For each gradual decoding refresh (GDR) AU in the bitstream, the following applies. If the AU is the first AU in the bitstream in decoding order or each picture is the first picture of the layer that follows an end of sequence NAL unit in decoding order, the variable NoIncorrectPicOutputFlag is set equal to one. Otherwise, if some external mechanism is available to set the variable HandleGdrAsCvsStartFlag to a value for the AU, HandleGdrAsCvsStartFlag is set equal to the value provided by the external mechanism and NoIncorrectPicOutputFlag is set equal to HandleGdrAsCvsStartFlag. Otherwise, HandleGdrAsCvsStartFlag and NoIncorrectPicOutputFlag are both set equal to zero. The above operations, for both IRAP pictures and GDR pictures, are used for identification of the CVSs in the bitstream. Decoding is repeatedly invoked for each coded picture in BitstreamToDecode in decoding order.

An example decoding process for reference picture lists construction is as follows. This process is invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list 0 (e.g., RefPicList[0]), is used in decoding of the slice data. When decoding a B slice, both reference picture list 0 and reference picture list 1 (e.g., RefPicList[1]) are used in decoding of the slice data.

The following constraints apply for bitstream conformance. For each i equal to zero or one, num_ref_entries[i][RplsIdx[i]] should not be less than NumRefIdxActive[i]. The picture referred to by each active entry in RefPicList[0] or RefPicList[1] should be present in the DPB and should have TemporalId less than or equal to that of the current picture. The picture referred to by each entry in RefPicList[0] or RefPicList[1] should not be the current picture and should have non_reference_picture_flag equal to zero. An short term reference picture (STRP) entry in RefPicList[0] or RefPicList[1] of a slice of a picture and an long term reference picture (LTRP) entry in RefPicList[0] or RefPicList[1] of the same slice or a different slice of the same picture should not refer to the same picture. There should be no LTRP entry in RefPicList[0] or RefPicList[1] for which the difference between the PicOrderCntVal of the current picture and the PicOrderCntVal of the picture referred to by the entry is greater than or equal to two hundred twenty four.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics should be less than or equal to MaxDecPicBuffMinus1 and setOfRefPics should be the same for all slices of a picture. When the current picture is an step-wise temporal sublayer access (STSA) picture, there should be no active entry in RefPicList[0] or RefPicList[ 1] that has TemporalId equal to that of the current picture. When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

The picture referred to by each interlayer reference picture (ILRP) entry in RefPicList[0] or RefPicList[1] of a slice of the current picture shall be in the same access unit as the current picture. The picture referred to by each ILRP entry in RefPicList[0] or RefPicList[1] of a slice of the current picture shall be present in the DPB and shall have nuh_layer_id less than that of the current picture. Each ILRP entry in RefPicList[0] or RefPicList[1] of a slice should be an active entry.

An example HRD specification is as follows. The HRD is used to check bitstream and decoder conformance. A set of bitstream conformance tests is used for checking the conformance of a bitstream, which is referred to as the entire bitstream, denoted as entireBitstream. The set of bitstream conformance tests are for testing the conformance of each OP of each OLS specified by the VPS.

For each test, the following ordered steps apply in the order listed, followed by the processes described after these steps in this clause. An operation point under test, denoted as targetOp, is selected by selecting a target OLS with OLS index opOlsIdx and a highest TemporalId value opTid. The value of opOlsIdx is in the range of zero to TotalNumOlss−1, inclusive. The value of opTid is in the range of zero to vps_max_sub_layers_minus1, inclusive. Each pair of selected values of opOlsIdx and opTid shall be such that the sub-bitstream that is the output by invoking the sub-bitstream extraction process with entireBitstream, opOlsIdx, and opTid as inputs satisfy the following conditions. There is at least one VCL NAL unit with nuh_layer_id equal to each of the nuh_layer_id values in LayerIdInOls[opOlsIdx] in BitstreamToDecode. There is at least one VCL NAL unit with TemporalId equal to opTid in BitstreamToDecode.

If the layers in targetOp include all layers in the entireBitstream and opTid is equal to greater than the highest TemporalId value among all NAL units in entireBitstream, BitstreamToDecode is set to be identical to entireBitstream. Otherwise, BitstreamToDecode is set to be the output by invoking the sub-bitstream extraction process with entireBitstream, opOlsIdx, and opTid as inputs. The values of TargetOlsIdx and Htid are set equal to opOlsIdx and opTid, respectively, of targetOp. A value of ScIdx is selected. The selected ScIdx shall be in the range of zero to hrd_cpb_cnt_minus1, inclusive. An access unit in BitstreamToDecode associated with buffering period SEI messages (present in TargetLayerBitstream or available through external mechanisms) applicable to TargetOlsIdx is selected as the HRD initialization point and referred to as access unit zero for each layer in the target OLS.

The subsequent steps apply to each layer with OLS layer index TargetOlsLayerIdx in the target OLS. The ols_hrd_parameters( ) syntax structure and the sub_layer_hrd_parameters( ) syntax structure applicable to BitstreamToDecode are selected as follows. The ols_hrd_idx[TargetOlsIdx]-th ols_hrd_parameters( ) syntax structure in the VPS (or provided through an external mechanism) is selected. Within the selected ols_hrdparameters( ) syntax structure, if BitstreamToDecode is a Type I bitstream, the sub_layer_hrd_parameters(Htid) syntax structure that immediately follows the condition if (general_vcl_hrd_params_present_flag) is selected and the variable NalHrdModeFlag is set equal to zero. Otherwise (BitstreamToDecode is a Type II bitstream), the sub_layer_hrd_parameters(Htid) syntax structure that immediately follows either the condition if (general_vcl_hrd_params_present_flag) (in this case the variable NalHrdModeFlag is set equal to zero) or the condition if (general_nal_hrd_params_present_flag) (in this case the variable NalHrdModeFlag is set equal to 1) is selected. When BitstreamToDecode is a Type II bitstream and NalHrdModeFlag is equal to zero, all non-VCL NAL units except filler data NAL units, and all leading_zero_8 bits, zero_byte, start_code_prefix_one3 bytes and trailing_zero_8 bits syntax elements that form a byte stream from the NAL unit stream, when present, are discarded from BitstreamToDecode and the remaining bitstream is assigned to BitstreamToDecode.

When decoding_unit_hrd_params_present_flag is equal to one, the CPB is scheduled to operate either at the access unit level (in which case the variable DecodingUnitHrdFlag is set equal to zero) or at the decoding unit level (in which case the variable DecodingUnitHrdFlag is set equal to one). Otherwise, DecodingUnitHrdFlag is set equal to zero and the CPB is scheduled to operate at the access unit level.

For each access unit in BitstreamToDecode starting from access unit zero, the buffering period SEI message (present in BitstreamToDecode or available through external mechanisms) that is associated with the access unit and applies to TargetOlsIdx is selected, the picture timing SEI message (present in BitstreamToDecode or available through external mechanisms) that is associated with the access unit and applies to TargetOlsIdx is selected, and when DecodingUnitHrdFlag is equal to one and decoding_unit_cpb_params_in_pic_timing_sei_flag is equal to zero, the decoding unit information SEI messages (present in BitstreamToDecode or available through external mechanisms) that are associated with decoding units in the access unit and apply to TargetOlsIdx are selected.

Each conformance test includes of a combination of one option in each of the above steps. When there is more than one option for a step, for any particular conformance test only one option is chosen. All possible combinations of all the steps form the entire set of conformance tests. For each operation point under test, the number of bitstream conformance tests to be performed is equal to n1*n1*n2*n3, where the values of n0, n1, n2, and n3 are specified as follows. n1 is equal to hrd_cpb_cnt_minus1+1. n1 is the number of access units in BitstreamToDecode that are associated with buffering period SEI messages. n2 is derived as follows. If BitstreamToDecode is a Type I bitstream, n0 is equal to one. Otherwise (BitstreamToDecode is a Type II bitstream), n0 is equal to two. n3 is derived as follows. If decoding_unit_hrd_params_present_flag is equal to zero, n3 is equal to one. Otherwise, n3 is equal to two.

The HRD contains a bitstream extractor (optionally present), a coded picture buffer (CPB), an instantaneous decoding process, a decoded picture buffer (DPB) that conceptually contains a sub-DPB for each layer, and output cropping. For each bitstream conformance test, the CPB size (number of bits) is CpbSize[Htid][ScIdx], and DPB parameters max_dec_pic_buffering_minus1[Htid], max_num_reorder_pics[Htid], and MaxLatencyPictures[Htid] for each layer are found in or derived from the dpb_parameters( ) syntax structure that applies to the layer depending on whether the layer is an independent layer and whether the layer is an output layer of the target OLS.

The HRD may operate as follows. The HRD is initialized at decoding unit zero, with both the CPB and each sub-DPB of the DPB being set to be empty (the sub-DPB fullness for each sub-DPB is set equal to zero). After initialization, the HRD may not be initialized again by subsequent buffering period SEI messages. Data associated with decoding units that flow into each CPB according to a specified arrival schedule are delivered by the hypothetical stream scheduler (HSS). The data associated with each decoding unit are removed and decoded instantaneously by the instantaneous decoding process at the CPB removal time of the decoding unit. Each decoded picture is placed in the DPB. A decoded picture is removed from the DPB when the decoded picture is no longer needed for inter prediction reference and no longer needed for output.

An example operation of the decoded picture buffer is as follows. These specifications may apply independently to each set of decoded picture buffer (DPB) parameters selected. The decoded picture buffer conceptually includes sub-DPBs and each sub-DPB contains picture storage buffers for storage of decoded pictures of one layer. Each of the picture storage buffers may contain a decoded picture that is marked as used for reference or is held for later output. The processes described herein are sequentially applied, and are applied independently for each layer, starting from the lowest layer in the OLS, in increasing order of nuh_layer_id values of the layers in the OLS. When these processes are applied for a particular layer, only the sub-DPB for the particular layer is affected. In the descriptions of these processes, the DPB refers to the sub-DPB for the particular layer, and the particular layer is referred to as the current layer.

In the operation of the output timing DPB, decoded pictures with PicOutputFlag equal to one in the same access unit are output consecutively in ascending order of the nuh_layer_id values of the decoded pictures. Let picture n and the current picture be the coded picture or decoded picture of the access unit n for a particular value of nuh_layer_id, wherein n is a non-negative integer number. Removal of pictures from the DPB before decoding of the current picture occurs as follows. The removal of pictures from the DPB before decoding of the current picture (but after parsing the slice header of the first slice of the current picture) happens substantially instantaneously at the CPB removal time of the first decoding unit of access unit n (containing the current picture) and proceeds as follows.

The decoding process for reference picture list construction is invoked and the decoding process for reference picture marking is invoked. When the current AU is a coded video sequence start (CVSS) AU that is not AU zero, the following ordered steps are applied. The variable NoOutputOfPriorPicsFlag is derived for the decoder under test as follows. If the value of pic_width_max_in_luma_samples, pic_height_max_in_luma_samples, chroma_format_idc, separate_colour_plane_flag, bit_depth_luma_minus8, bit_depth_chroma_minus8 or max_dec_pic_buffering_minus1[Htid] derived for any picture in the current AU is different from the value of pic_width_in_luma_samples, pic_height_in_luma_samples, chroma_format_idc, separate_colour_plane_flag, bit_depth_luma_minus8, bit_depth_chroma_minus8 or max_dec_pic_buffering_minus1[Htid], respectively, derived for the preceding picture in the same CLVS, NoOutputOfPriorPicsFlag may be set to one by the decoder under test, regardless of the value of no_output_of_prior_pics_flag. Although setting NoOutputOfPriorPicsFlag equal to no_output_of_prior_pics_flag may be preferred under these conditions, the decoder under test is allowed to set NoOutputOfPriorPicsFlag to one in this case. Otherwise, NoOutputOfPriorPicsFlag is set equal to no_output_of_prior_pics_flag.

The value of NoOutputOfPriorPicsFlag derived for the decoder under test is applied for the HRD, such that when the value of NoOutputOfPriorPicsFlag is equal to one, all picture storage buffers in the DPB are emptied without output of the pictures they contain, and the DPB fullness is set equal to zero. When both of the following conditions are true for any pictures k in the DPB, all such pictures k in the DPB are removed from the DPB. Picture k can be marked as unused for reference, or picture k can have a PictureOutputFlag equal to zero or a DPB output time is less than or equal to the CPB removal time of the first decoding unit (denoted as decoding unit m) of the current picture n, where DpbOutputTime[k] is less than or equal to DuCpbRemovalTime[m]. For each picture that is removed from the DPB, the DPB fullness is decremented by one.

The operation of the output order DPB may be as follows. These processes may be applied independently to each set of decoded picture buffer (DPB) parameters selected. The decoded picture buffer conceptually contains sub-DPBs and each sub-DPB contains picture storage buffers for storage of decoded pictures of one layer. Each of the picture storage buffers contains a decoded picture that is marked as used for reference or is held for future output. The process for output and removal of pictures from the DPB before decoding of the current picture is invoked, followed by the invocation of the process for current decoded picture marking and storage, and finally followed by the invocation of the process for additional bumping. These processes are applied independently for each layer, starting from the lowest layer in the OLS, in increasing order of the nuh_layer_id values of the layers in the OLS. When these processes are applied for a particular layer, only the sub-DPB for the particular layer is affected.

In the operation of output order DPB, same as in the operation of output timing DPB, decoded pictures with PicOutputFlag equal to one in the same access unit are also output consecutively in ascending order of the nuh_layer_id values of the decoded pictures. Let picture n and the current picture be the coded picture or decoded picture of the access unit n for a particular value of nuh_layer_id, wherein n is a non-negative integer number. The output and removal of pictures from the DPB is described as follows.

The output and removal of pictures from the DPB before the decoding of the current picture (but after parsing the slice header of the first slice of the current picture) occurs substantially instantaneously when the first decoding unit of the access unit containing the current picture is removed from the CPB and proceeds as follows. The decoding process for reference picture list construction and decoding process for reference picture marking are invoked. If the current AU is a CVSS AU that is not AU zero, the following ordered steps are applied. The variable NoOutputOfPriorPicsFlag is derived for the decoder under test as follows. If the value of pic_width_maxin_luma_samples, pic_height_max_in_luma_samples, chroma_format_idc, separate_colour_plane_flag, bit_depth_luma_minus8, bit_depth_chroma_minus8 or max_decpic_buffering_minus1[Htid] derived for any picture of the current AU is different from the value of pic_width_in_luma_samples, pic_height_in_luma_samples, chroma_format_idc, separate_colourplane_flag, bit_depth_luma_minus8, bit_depth_chroma_minus8 or max_dec_pic_buffering_minus1[Htid], respectively, derived for the preceding picture in the same CLVS, NoOutputOfPriorPicsFlag may be set to one by the decoder under test, regardless of the value of no_output_of prior_pics_flag.

Although setting NoOutputOfPriorPicsFlag equal to no_output_of_prior_pics_flag may be preferred under these conditions, the decoder under test is allowed to set NoOutputOfPriorPicsFlag to one in this case. Otherwise, NoOutputOfPriorPicsFlag is set equal to no_output_of_prior_pics_flag. The value of NoOutputOfPriorPicsFlag derived for the decoder under test is applied for the HRD as follows. If NoOutputOfPriorPicsFlag is equal to one, all picture storage buffers in the DPB are emptied without output of the pictures they contain and the DPB fullness is set equal to zero. Otherwise (NoOutputOfPriorPicsFlag is equal to zero), all picture storage buffers containing a picture that is marked as not needed for output and unused for reference are emptied (without output) and all non-empty picture storage buffers in the DPB are emptied by repeatedly invoking a bumping and the DPB fullness is set equal to zero.

Otherwise (the current picture is not a CLVSS picture), all picture storage buffers containing a picture which are marked as not needed for output and unused for reference are emptied (without output). For each picture storage buffer that is emptied, the DPB fullness is decremented by one. When one or more of the following conditions are true, the bumping process is invoked repeatedly while further decrementing the DPB fullness by one for each additional picture storage buffer that is emptied, until none of the following conditions are true. The number of pictures in the DPB that are marked as needed for output is greater than max_num_reorder_pics[Htid]. The max_latency_increase_plus1[Htid] is not equal to zero and there is at least one picture in the DPB that is marked as needed for output for which the associated variable PicLatencyCount is greater than or equal to MaxLatencyPictures[Htid]. The number of pictures in the DPB is greater than or equal to max_dec_pic_buffering_minus1[Htid]+1.

In an example, additional bumping may occur as follows. The processes specified may occur substantially instantaneously when the last decoding unit of access unit n containing the current picture is removed from the CPB. When the current picture has PictureOutputFlag equal to one, for each picture in the DPB that is marked as needed for output and follows the current picture in output order, the associated variable PicLatencyCount is set equal to PicLatencyCount+1. The following also apply. If the current decoded picture has PictureOutputFlag equal to one, the current decoded picture is marked as needed for output and an associated variable PicLatencyCount is set equal to zero. Otherwise (the current decoded picture has PictureOutputFlag equal to zero), the current decoded picture is marked as not needed for output.

When one or more of the following conditions are true, the bumping process is invoked repeatedly until none of the following conditions are true. The number of pictures in the DPB that are marked as needed for output is greater than max_num_reorder_pics[Htid]. The max_latency_increase_plus1[Htid] is not equal to zero and there is at least one picture in the DPB that is marked as needed for output for which the associated variable PicLatencyCount that is greater than or equal to MaxLatencyPictures[Htid].

The bumping process includes of the following ordered steps. The picture or pictures that are first for output are selected as the one having the smallest value of PicOrderCntVal of all pictures in the DPB marked as needed for output. Each of these pictures, in ascending nuh_layer_id order, is cropped, using the conformance cropping window for the picture, the cropped picture is output, and the picture is marked as not needed for output. Each picture storage buffer that contains a picture marked as unused for reference and that was one of the pictures cropped and output is emptied and the fullness of the associated sub-DPB is decremented by one. For any two pictures picA and picB that belong to the same CVS and are output by the bumping process, when picA is output earlier than picB, the value of PicOrderCntVal of picA is less than the value of PicOrderCntVal of picB.

An example sub-bitstream extraction process is as follows. Inputs to this process are a bitstream inBitstream, a target OLS index targetOlsIdx, and a target highest TemporalId value tIdTarget. Output of this process is a sub-bitstream outBitstream. Bitstream conformance may require that, for any input bitstream, an output sub-bitstream that is the output from this process with the bitstream, targetOlsIdx equal to an index to the list of OLSs specified by the VPS, and tIdTarget equal to any value in the range of zero to six, inclusive, as inputs, and that satisfies the following conditions shall be a conforming bitstream. The output sub-bitstream contains at least one VCL NAL unit with nuh_layer_id equal to each of the nuh_layer_id values in LayerIdInOls[targetOlsIdx]. The output sub-bitstream contains at least one VCL NAL unit with TemporalId equal to tIdTarget. A conforming bitstream contains one or more coded slice NAL units with TemporalId equal to zero, but does not have to contain coded slice NAL units with nuh_layer_id equal to zero.

The output sub-bitstream OutBitstream is derived as follows. The bitstream outBitstream is set to be identical to the bitstream inBitstream. All NAL units with TemporalId greater than tIdTarget are removed from outBitstream. All NAL units with nuh_layer_id not included in the list LayerIdInOls[targetOlsIdx] are removed from outBitstream. All SEI NAL units that contain a scalable nesting SEI message that has nesting_ols_flag equal to one and there is no value of i in the range of zero to nesting_num_olss_minus1, inclusive, such that NestingOlsIdx[i] is equal to targetOlsIdx are removed from outBitstream. When targetOlsIdx is greater than zero, all SEI NAL units that contain a non-scalable-nested SEI message with payloadType equal to zero (buffering period), one (picture timing), or one hundred thirty (decoding unit information) are removed from outBitstream.

An example scalable nesting SEI message syntax is as follows.

| scalable_nesting( payloadSize ) { | Descriptor |
|---|---|
|   nesting_ols_flag | u(1) |
|   if( nesting_ols_flag ) { | |
|     nesting_num_olss_minus1 | ue(v) |
|     for( i = 0; i <= nesting_num_olss_minus1; i++ ) | |
|       nesting_ols_idx_delta_minus1[ i ] | ue(v) |
|   } else { | |
|     nesting_all_layers_flag | u(1) |
|     if( !nesting_all_layers_flag ) { | |
|       nesting_num_layers_minus1 | ue(v) |
|       for( i = 1; i <= nesting_num_layers_minus1; i++ ) | |
|         nesting_layer_id[ i ] | u(6) |
|     } | |
|   } | |
|   nesting_num_seis_minus1 | ue(v) |
|   while( !byte_aligned( ) ) | |
|     nesting_zero_bit /* equal to 0 */ | u(1) |
|   for( i = 0; i <= nesting_num_seis_minus1; i++ ) | |
|     sei_message( ) | |
| } | |

An example general SEI payload semantics is as follows. The following applies on the applicable layers or OLS of non-scalable-nested SEI messages. For a non-scalable-nested SEI message, when payloadType is equal to zero (buffering period), one (picture timing), or one hundred thirty (decoding unit information), the non-scalable-nested SEI message applies only to the 0-th OLS. For a non-scalable-nested SEI message, when payloadType is equal to any value among VclAssociatedSeiList, the non-scalable-nested SEI message applies only to the layer for which the VCL NAL units have nuh_layer_id equal to the nuh_layer_id of the SEI NAL unit containing the SEI message.

Bitstream conformance may require that the following restrictions apply on the value of nuh_layer_id of SEI NAL units. When a non-scalable-nested SEI message has payloadType equal to zero (buffering period), one (picture timing), or one hundred thirty (decoding unit information), the SEI NAL unit containing the non-scalable-nested SEI message should have nuh_layer_id equal to vps_layer_id[0]. When a non-scalable-nested SEI message has payloadType equal to any value among VclAssociatedSeiList, the SEI NAL unit containing the non-scalable-nested SEI message should have nuh_layer_id equal to the value of nuh_layer_id of the VCL NAL unit associated with the SEI NAL unit. An SEI NAL unit containing a scalable nesting SEI message should have nuh_layer_id equal to the lowest value of nuh_layer_id of all layers to which the scalable-nested SEI message apply (when nesting_ols_flag of the scalable nesting SEI message is equal to zero) or the lowest value of nuh_layer_id of all layers in the OLSs to which the scalable-nested SEI message apply (when nesting_ols_flag of the scalable nesting SEI message is equal to one).

An example scalable nesting SEI message semantics is as follows. The scalable nesting SEI message provides a mechanism to associate SEI messages with specific OLSs or with specific layers. A scalable nesting SEI message contains one or more SEI messages. The SEI messages contained in the scalable nesting SEI message are also referred to as the scalable-nested SEI messages. Bitstream conformance may require that the following restrictions apply on containing of SEI messages in a scalable nesting SEI message.

An SEI message that has payloadType equal to one hundred thirty two (decoded picture hash) or one hundred thirty three (scalable nesting) may not be contained in a scalable nesting SEI message. When a scalable nesting SEI message contains a buffering period, picture timing, or decoding unit information SEI message, the scalable nesting SEI message should not contain any other SEI message with payloadType not equal to zero (buffering period), one (picture timing), or one hundred thirty (decoding unit information).

Bitstream conformance may require that the following restrictions apply on the value of the nal_unit_type of the SEI NAL unit containing a scalable nesting SEI message. When a scalable nesting SEI message contains an SEI message that has payloadType equal to zero (buffering period), one (picture timing), one hundred thirty (decoding unit information), one hundred forty five (dependent RAP indication), or one hundred sixty eight (frame-field information), the SEI NAL unit containing the scalable nesting SEI message should have a nal_unit_type equal to PREFIX_SEI_NUT.

A nesting_ols_flag equal to one specifies that the scalable-nested SEI messages apply to specific OLSs. A nesting_ols_flag equal to zero specifies that the scalable-nested SEI messages apply to specific layers. Bitstream conformance may require that the following restrictions apply on the value of nesting_ols_flag. When the scalable nesting SEI message contains an SEI message that has payloadType equal to zero (buffering period), one (picture timing), or one hundred thirty (decoding unit information), the value of nesting_ols_flag should be equal to one. When the scalable nesting SEI message contains an SEI message that has payloadType equal to a value in VclAssociatedSeiList, the value of nesting_ols_flag should be equal to zero. nesting_num_olss_minus1 plus 1 specifies the number of OLSs to which the scalable-nested SEI messages apply. The value of nesting_num_olss_minus1 should be in the range of 0 to TotalNumOlss−1, inclusive.

A nesting_ols_idx_delta_minus1[i] is used to derive the variable NestingOlsIdx[i] that specifies the OLS index of the i-th OLS to which the scalable-nested SEI messages apply when nesting_ols_flag is equal to one. The value of nesting_ols_idx_delta_minus1[i] should be in the range of zero to TotalNumOlss minus two, inclusive, inclusive. The variable NestingOlsIdx[i] may be derived as follows.

```
if( i = = 0 )
    NestingOlsIdx[ i ] = nesting_ols_idx_delta_minus1[ i ]
else
    NestingOlsIdx[ i ] = NestingOlsIdx[ i − 1 ] + nesting_ols_idx_delta_minus1[ i ] + 1
```

A nesting_all_layers_flag equal to one specifies that the scalable-nested SEI messages apply to all layers that have nuh_layer_id greater than or equal to the nuh_layer_id of the current SEI NAL unit. A nesting_all_layers_flag equal to zero specifies that the scalable-nested SEI messages may or may not apply to all layers that have nuh_layer_id greater than or equal to the nuh_layer_id of the current SEI NAL unit. A nesting_num_layers_minus1 plus 1 specifies the number of layers to which the scalable-nested SEI messages apply. The value of nesting_num_layers_minus1 should be in the range of zero to vps_max_layers_minus1—GeneralLayerIdx[nuh_layer_id], inclusive, where nuh_layer_id is the nuh_layer_id of the current SEI NAL unit. A nesting_layer_id[i] specifies the nuh_layer_id value of the i-th layer to which the scalable-nested SEI messages apply when nesting_all_layers_flag is equal to zero. The value of nesting_layer_id[i] should be greater than nuh_layer_id, where nuh_layer_id is the nuh_layer_id of the current SEI NAL unit.

When nesting_ols_flag is equal to zero, the variable NestingNumLayers, specifying the number of layers to which the scalable-nested SEI messages apply, and the list NestingLayerId[i] for i in the range of zero to NestingNumLayers−1, inclusive, specifying the list of nuh_layer_id value of the layers to which the scalable-nested SEI messages apply, may be derived as follows, where nuh_layer_id is the nuh_layer_id of the current SEI NAL unit.

```
if( nesting_all_layers_flag ) {
    NestingNumLayers = vps_max_layers_minus1 +
        1 − GeneralLayerIdx[ nuh_layer_id ]
    for( i = 0; i < NestingNumLayers; i ++)
        NestingLayerId[ i ] =
            vps_layer_id[ GeneralLayerIdx[ nuh_layer_id ] + i ]
} else {
    NestingNumLayers = nesting_num_layers_minus1 + 1
    for( i = 0; i < NestingNumLayers; i ++)
        NestingLayerId[ i ] = ( i == 0 ) ?
            nuh_layer_id : nesting_layer_id[ i ]
}
```

A nesting_num_seis_minus1 plus one specifies the number of scalable-nested SEI messages. The value of nesting_num_seis_minus1 should be in the range of zero to sixty three inclusive. The nesting_zero_bit should be equal to zero.

Figure 9:
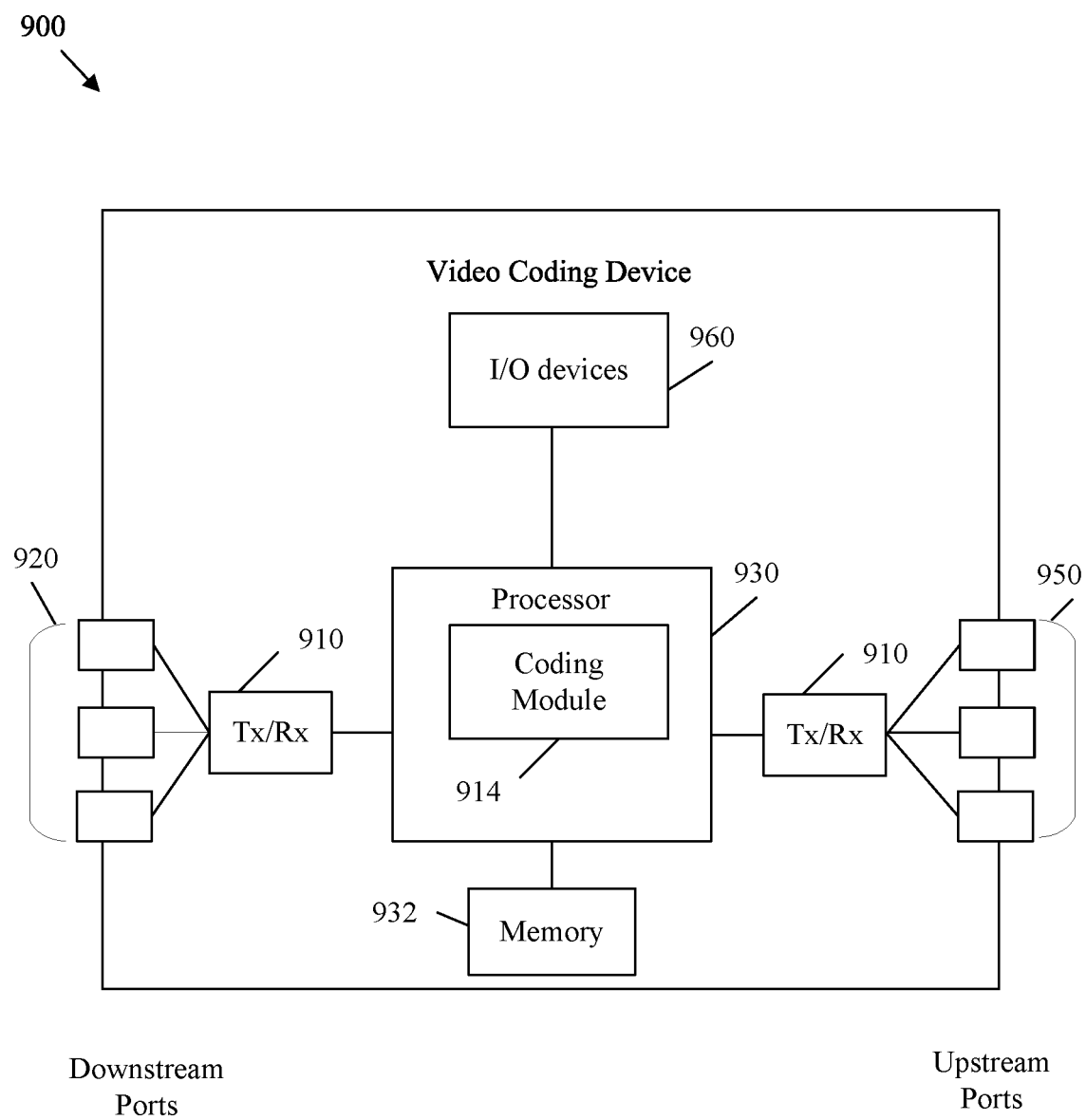
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, which may employ a multi-layer video sequence 600, a RPL structure 700, and/or a bitstream 800. The coding module 914 may also implement any other method/mechanism described herein. Further, the coding module 914 may implement a codec system 200, an encoder 300, a decoder 400, and/or a HRD 500. For example, the coding module 914 may constrain the number of reference entries in an RPL structure based on a maximum decoded picture size. The maximum decoded picture buffer size may vary depending on whether a layer is a reference layer or an output layer. As such, by applying the constrain, the coding module 914 can allow different numbers of reference pictures to be employed for output layers and reference layers. This allows the coding module 914 to provide more optimal memory usage and increase coding efficiency. Accordingly, the coding module 914 may be configured to perform mechanisms to address one or more of the problems discussed above. Hence, coding module 914 causes the video coding device 900 to provide additional functionality and/or coding efficiency when coding video data. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

Figure 10:
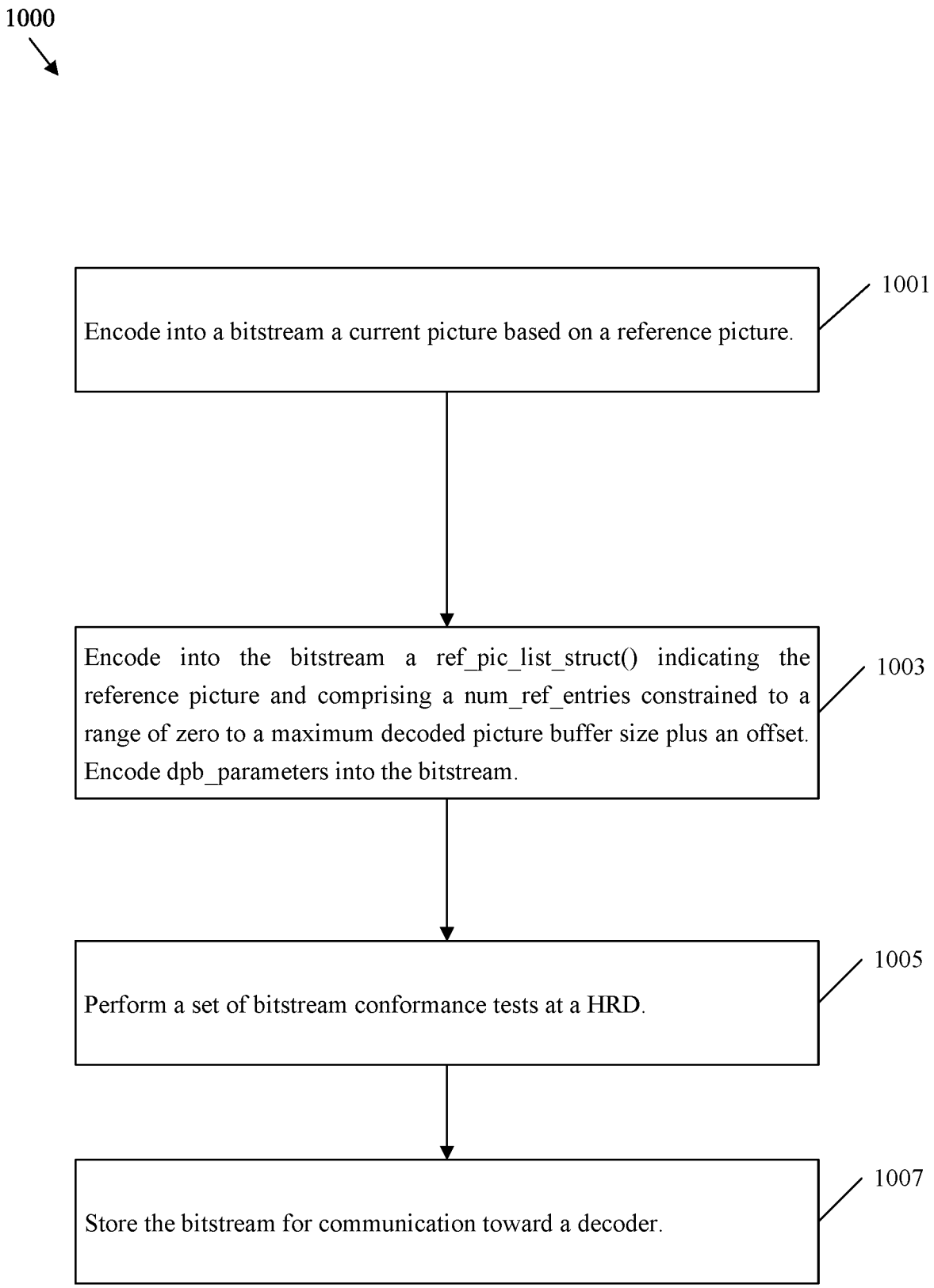
FIG. 10 is a flowchart of an example method of encoding a video sequence into a bitstream based on a reference picture list structure with a number of reference entries constrained according to a maximum decoded picture buffer size.

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution FIG. 10 is a flowchart of an example method 1000 of encoding a video sequence into a bitstream, such as bitstream 800, based on a reference picture list structure, such as RPL structure 700, with a number of reference entries constrained according to a maximum decoded picture buffer size. Method 1000 may be employed by an encoder, such as a codec system 200, an encoder 300, and/or a video coding device 900 when performing method 100. Further, the method 1000 may operate on a HRD 500 and hence may perform conformance tests on a multi-layer video sequence 600 and/or an extracted layer thereof.

Method 1000 may begin when an encoder receives a video sequence and determines to encode that video sequence, such as a multilayer video sequence, into a bitstream, for example based on user input. At step 1001, the encoder encodes pictures from the video sequence into a bitstream. For example, the encoder can encode a current picture according to inter-prediction and/or inter-layer prediction. As such, the encoder encodes the current picture based on a reference picture.

At step 1003, the encoder can encode a ref_pic_list_struct( ) into the bitstream, for example in an SPS, a picture header, and/or a slice header. The ref_pic_list_struct( ) indicates the reference picture used when coding the current picture according to inter-prediction. Specifically, the refpic_list_struct( ) includes a RefPicList[0] and a RefPicList[1]. The RefPicList[0] and a RefPicList[1] each contain one or more reference entries that reference any reference pictures used for coding the current picture. The refpic_list_struct( ) can be referenced according to a list index (listIdx) and a reference picture list structure index (rplsIx), denoted as ref_pic_list_struct(listIdx, rplsIdx). The ref_pic_list_struct( ) references a setOfRefPics, which is a set unique pictures referred to by all entries in RefPicList[0] that have a same nuh_layer_id as the current picture and all entries of in RefPicList[1] that have the same nuh_layer_id as the current picture. Accordingly, the setOfRefPics includes all of the reference pictures for the current picture that are in the same layer as the current picture. The setOfRefPics may be constrained to be the same set for all slices of each picture. As such, the setOfRefPics may be constrained to be the same set for all slices of the current picture. Further, the ref_pic_list_struct( ) and hence the bitstream, comprises a num_ref_entries. The num_ref_entries may be denoted as num_ref_entries [ listIdx ][ rplsIdx ]. The num_ref_entries [listIdx][rplsIdx] specifies a number of entries in the ref_pic_list_struct(listIdx, rplsIdx). The num_ref_entries constrained to a range based on a maximum decoded picture buffer size, such as a range of zero to the maximum decoded picture buffer size plus an offset such as thirteen or fourteen entries. Further, the setOfRefPics referred to in the ref_pic_list_struct is constrained to be less than or equal to the maximum decoded picture buffer size minus one. In this way, both the num_ref_entries and the setOfRefPics are constrained based on the memory available in the DPB that varies based on layer and not based on a static value that is global to all layers. This allows these values to vary based on whether the current picture is associated with an output layer, which employs more memory space, or a reference layer, which employs less space. As such, constraining the num_ref_entries and the setOfRefPics based on maximum DPB size supports increased coding efficiency (better compression), which reduces processor, memory, and/or network signaling resource usage.

The encoder also encodes a dpb_parameters( ) in the bitstream, for example in a VPS and/or the SPS. The dpb_parameters( ) can comprise a max_dec_pic_buffering_minus1. The max_dec_pic_buffering_minus1 specifies a maximum required size of the DPB in units of picture storage buffers. As such, the maximum decoded picture buffer size used to constrain the num_ref_entries and the setOfRefPics corresponds to the max_dec_pic_buffering_minus1.

At step 1005, a HRD at the encoder can perform a set of bitstream conformance tests on the bitstream. As a specific example, the HRD can check the bitstream to confirm that the num_ref_entries and the setOfRefPics are constrained based on the maximum DPB size, for example as described by the max_dec_pic_buffering_minus1 in the dpb_parameters( ). The encoder can then store the bitstream at step 1007 for communication toward a decoder upon request. For example, the encoder can store the bitstream locally and/or forward the bitstream to a content server for storage. Further, the encoder and/or content server can perform a sub-bitstream extraction on the bitstream to separate content related to a layer and/or an OLS for transmission to a decoder upon request.

FIG. 11 is a flowchart of an example method 1100 of decoding a video sequence from a bitstream, such as bitstream 800, based on a reference picture list structure, such as RPL structure 700, with a number of reference entries constrained according to a maximum decoded picture buffer size. Method 1100 may be employed by a decoder, such as a codec system 200, a decoder 400, and/or a video coding device 900 when performing method 100. Further, method 1100 may be employed on a multi-layer video sequence 600, or an extracted layer thereof, that has been checked for conformance by a HRD, such as HRD 500.

Method 1100 may begin when a decoder begins receiving a bitstream containing a coded video sequence, such as a coded layer video sequence from one or more layers of a multi-layer bitstream, for example as a result of method 1000. At step 1101, the decoder receives a bitstream. The bitstream comprises a sequence of pictures including a current picture, which maybe any specified picture being decoded at a specified instant in time. In this example, the current picture is coded according to inter-prediction and/or inter-layer prediction. As such, the encoder encodes the current picture based on a reference picture.

The bitstream also comprises a ref_pic_list_struct( ) for example in an SPS, a picture header, and/or a slice header. The ref_pic_list_struct( ) indicates the reference picture used when coding the current picture according to inter-prediction. Specifically, the ref_pic_list_struct( ) includes a RefPicList[0] and a RefPicList[1]. The RefPicList[0] and a RefPicList[1] each contain one or more reference entries that reference any reference pictures used for coding the current picture. The ref_pic_list_struct( ) can be referenced according to a list index (listIdx) and a reference picture list structure index (rplsIdx), denoted as ref_pic_list_struct(listIdx, rplsIdx). The ref_pic_list_struct( ) references a setOfRefPics, which is a set unique pictures referred to by all entries in RefPicList[0] that have a same nuh_layer_id as the current picture and all entries of in RefPicList[1] that have the same nuh_layer_id as the current picture. Accordingly, the setOfRefPics includes all of the reference pictures for the current picture that are in the same layer as the current picture. The setOfRefPics may be constrained to be the same set for all slices of each picture. As such, the setOfRefPics may be constrained to be the same set for all slices of the current picture. Further, the ref_pic_list_struct( ), and hence the bitstream, comprises a num_ref_entries. The num_ref_entries may be denoted as num_ref_entries [listIdx][rplsIdx]. The num_ref_entries [listIdx][rplsIdx] specifies a number of entries in the ref_pic_list_struct(listIdx, rplsIdx). The num_ref_entries constrained to a range based on a maximum decoded picture buffer size, such as a range of zero to the maximum decoded picture buffer size plus an offset such as thirteen or fourteen entries. Further, the setOfRefPics referred to in the ref_pic_list_struct is constrained to be less than or equal to the maximum decoded picture buffer size minus one. In this way, both the num_ref_entries and the setOfRefPics are constrained based on the memory available in the DPB for a corresponding layer and not based on a static value applicable to all layers. This allows these values to vary based on whether the current picture is associated with an output layer, which employs more memory space, or a reference layer, which employs less space. As such, constraining the num_ref_entries and the setOfRefPics based on maximum DPB size supports increased coding efficiency (better compression), which reduces processor, memory, and/or network signaling resource usage.

The bitstream further comprises a dpb_parameters( ) for example in a VPS and/or the SPS. The dpb_parameters( ) can comprise a max_dec_pic_buffering_minus1. The max_dec_pic_buffering_minus1 specifies a maximum required size of the DPB in units of picture storage buffers. As such, the maximum decoded picture buffer size used to constrain the num_ref_entries and the setOfRefPics corresponds to the maxdec_pic_buffering_minus1.

At step 1103, the decoder can decode the current picture based on the ref_pic_list_struct( ) and/or the dpb_parameters( ) to produce a decoded picture. For example, the decoder can employ the dpb_parameters( ) and/or the max_dec_pic_buffering_minus1 to allocate memory space in the DPB. The decoder can also parse the ref_pic_list_struct( ) for the current picture to determine the reference entries in the RefPicList[0] and/or RefPicList[1] that indicate reference pictures used to code the current picture. The number of the decoder can determine the relevant reference entries based on the num_ref_entries and can determine the setOfRefPics based on the reference entries. The decoder can also employ a reference picture marking process to mark all of the picture in the setOfRefPics as used for long term reference or used for short term reference based on the ref_pic_list_struct( ). The reference picture marking process may mark one or more of the pictures that are not included in the setOfRefPics as not used for reference. Such pictures may be evicted from the DPB once they are no longer needed for output. Once the reference pictures have been marked, the decoder can decode the current picture based on the setOfRefPics. The decoder can also manage the DPB based on the marking of the various pictures after the reference picture marking process.

The decoder can then forward the decoded picture for display as part of a decoded video sequence at step 1105. For example, the decoder can forward the decoded picture and/or decoded video sequence toward a screen, head mounted display, or other display device to be viewed by an end user.

Figure 12:
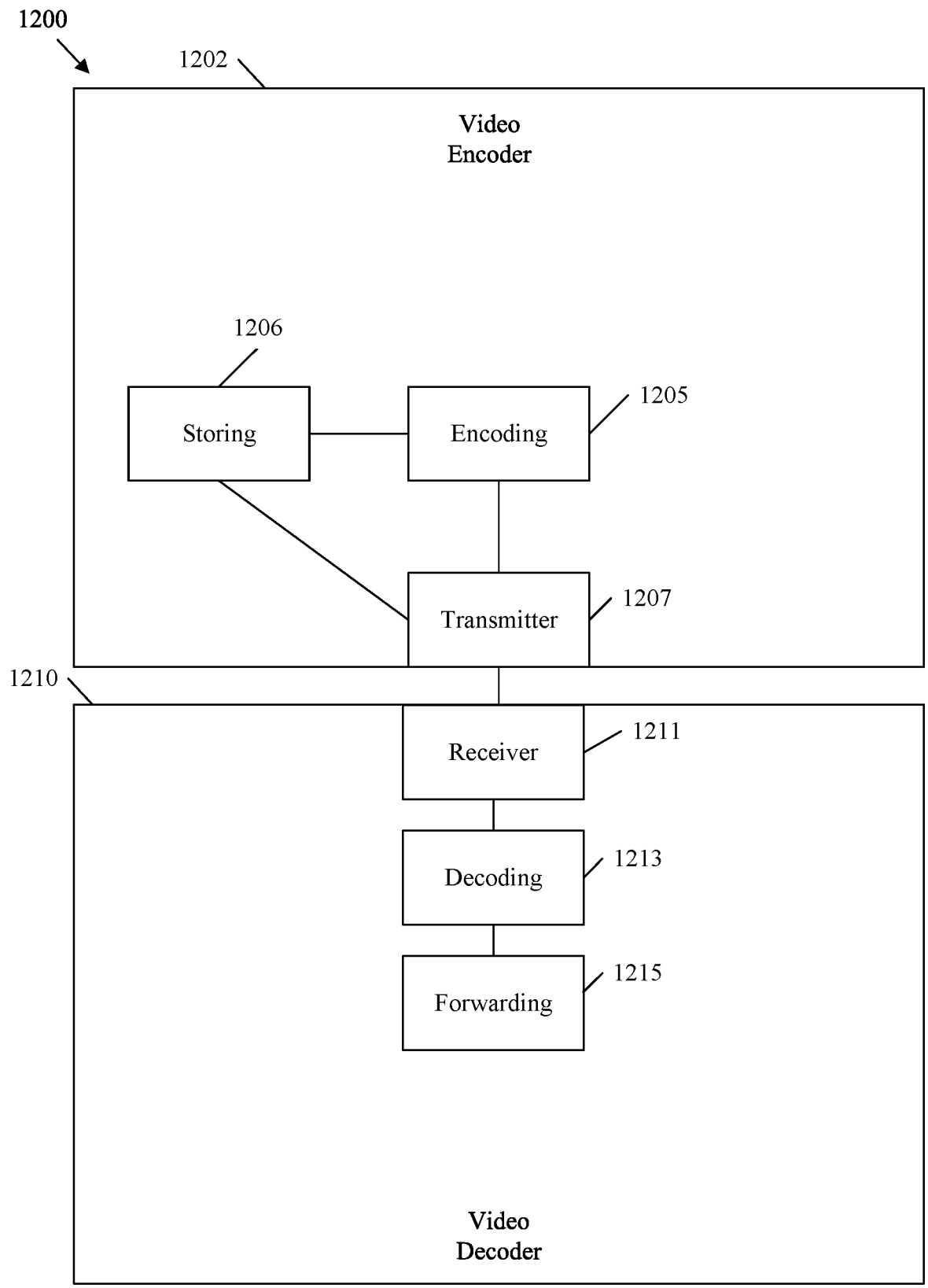
FIG. 12 is a schematic diagram of an example system for coding a video sequence into a bitstream based on a reference picture list structure with a number of reference entries constrained according to a maximum decoded picture buffer size.

FIG. 12 is a schematic diagram of an example system 1200 for coding a video sequence into a bitstream 800 based on a reference picture list structure, such as RPL structure 700, with a number of reference entries constrained according to a maximum decoded picture buffer size. System 1200 may be implemented by an encoder and a decoder such as a codec system 200, an encoder 300, a decoder 400, and/or a video coding device 900. Further, the system 1200 may employ a HRD 500 to perform conformance tests on a multi-layer video sequence 600 and/or a bitstream 800. In addition, system 1200 may be employed when implementing method 100, 1000, and/or 1100.

The system 1200 includes a video encoder 1202. The video encoder 1202 comprises an encoding module 1205 for encoding into a bitstream a current picture based on a reference picture. The encoding module 1205 is further for encoding into the bitstream a ref_pic_list_struct( ) indicating the reference picture and comprising a number of reference entries (num_ref_entries) constrained to a range based on a maximum decoded picture buffer size. The video encoder 1202 further comprises a storing module 1206 for storing the bitstream for communication toward a decoder. The video encoder 1202 further comprises a transmitting module 1207 for transmitting the bitstream toward a video decoder 1210. The video encoder 1202 may be further configured to perform any of the steps of method 1000.

The system 1200 also includes a video decoder 1210. The video decoder 1210 comprises a receiving module 1211 for receiving a bitstream comprising a current picture and a ref_pic_list_struct) comprising a num_ref_entries constrained to a range based on a maximum decoded picture buffer size. The video decoder 1210 further comprises a decoding module 1213 for decoding the current picture based on the ref_pic_list_struct( ) to produce a decoded picture. The video decoder 1210 further comprises a forwarding module 1215 for forwarding the decoded picture for display as part of a decoded video sequence. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
receiving a bitstream comprising a current picture, a decoded picture buffer parameter syntax structure (dpb_parameters( )), and a reference picture list syntax structure (ref_pic_list_struct( )) comprising a number of reference entries (num_ref_entries) constrained to a range of zero to a maximum decoded picture buffer size plus an offset, wherein the num_ref_entries specifies a number of entries in the ref_pic_list_struct( ), wherein the dpb_parameters( ) comprises a maximum decoded picture buffer minus one (max_dec_pic_buffering_minus1) that corresponds to the maximum decoded picture buffer size, wherein when the dpb_parameters( ) is included in a video parameter set (VPS), output layer sets (OLSs) to which the dpb_parameters( ) applies are specified by the VPS, and wherein when the dpb_parameters( ) is included in a sequence parameter set (SPS), OLSs to which the dpb_parameters( ) applies are specified by the SPS; and
decoding the current picture based on the ref_pic_list_struct( ) and dpb_parameters( ) to produce a decoded picture.

2. The method of claim 1, wherein the reference picture list syntax structure is referenced according to a list index (listIdx) and a reference picture list structure index (rplsIdx), denoted as ref_pic_list_struct(listIdx, rplsIdx), wherein the number of reference entries is denoted num_ref_entries[listIdx][rplsIdx], and wherein the num_ref_entries [listIdx][rplsIdx] specifies a number of entries in the ref_pic_list_struct(listIdx, rplsIdx).

3. The method of claim 1, wherein a number of pictures in a set of reference pictures (setOfRefPics) referred to in the reference picture list syntax structure is constrained to be less than or equal to the maximum decoded picture buffer size minus one.

4. The method of claim 3, wherein the reference picture list syntax structure includes a reference picture list zero (RefPicList[0]) and a reference picture list one (RefPicList[1]), and wherein the set of reference pictures is a set of unique pictures referred to by all entries in RefPicList[0] that have a same network abstraction layer (NAL) unit header layer identifier (nuh_layer_id) as the current picture and all entries of in RefPicList[1] that have the same nuh_layer_id as the current picture.

5. The method of claim 3, wherein the set of reference pictures is a same set for all slices of each picture.

6. The method of claim 1, wherein the reference picture list syntax structure (ref_pic_list_struct( )) is present in a sequence parameter set (SPS), a picture header (PH) syntax structure, or a slice header.

7. A method implemented by an encoder, the method comprising:
encoding a current picture based on a reference picture into a bitstream;
encoding a decoded picture buffer parameter syntax structure (dpb_parameters( )) into the bitstream;
encoding a reference picture list syntax structure (ref_pic_list_struct( )) into the bitstream, wherein the reference picture list syntax structure indicates the reference picture and comprises a number of reference entries (num_ref_entries), and wherein the number of reference entries are constrained to a range of zero to a maximum decoded picture buffer size plus an offset, wherein the num_ref_entries specifies a number of entries in the ref_pic_list_struct( ), wherein the dpb_parameters( ) comprises a maximum decoded picture buffer minus one (max_dec_pic_buffering_minus1) that corresponds to the maximum decoded picture buffer size, wherein when the dpb_parameters( ) is included in a video parameter set (VPS), output layer sets (OLSs) to which the dpb_parameters( ) applies are specified by the VPS, and wherein when the dpb_parameters( ) is included in a sequence parameter set (SPS), OLSs to which the dpb_parameters( ) applies are specified by the SPS; and
storing the bitstream for communication toward a decoder.

8. The method of claim 7, wherein the reference picture list syntax structure is referenced according to a list index (listIdx) and a reference picture list structure index (rplsIdx), denoted as ref_pic_list_struct(listIdx, rplsIdx), wherein the number of reference entries is denoted num_ref_entries [listIdx][rplsIdx], and wherein the num_ref_entries [listIdx][rplsIdx] specifies a number of entries in the ref_pic_list_struct(listIdx, rplsIdx).

9. The method of claim 7, wherein a number of pictures in a set of reference pictures (setOfRefPics) referred to in the reference picture list syntax structure is constrained to be less than or equal to the maximum decoded picture buffer size minus one.

10. The method of claim 9, wherein the reference picture list syntax structure includes a reference picture list zero (RefPicList[0]) and a reference picture list one (RefPicList[1]), and wherein the set of reference pictures is a set of unique pictures referred to by all entries in RefPicList[0] that have a same network abstraction layer (NAL) unit header layer identifier (nuh_layer_id) as the current picture and all entries of in RefPicList[1] that have the same nuh_layer_id as the current picture.

11. The method of claim 9, wherein the set of reference pictures is a same set for all slices of each picture.

12. A video coding device comprising:
a memory storing instructions;
one or more processors coupled to the memory, the one or more processors configured to execute the instructions to cause the video decoding device to:
receive a bitstream comprising a current picture, a decoded picture buffer parameter syntax structure (dpb_parameters( )), and a reference picture list syntax structure (ref_pic_list_struct( )) comprising a number of reference entries (num_ref_entries) constrained to a range of zero to a maximum decoded picture buffer size plus an offset, wherein the num_ref_entries specifies a number of entries in the ref_pic_list_struct( ), wherein the dpb_parameters( ) comprises a maximum decoded picture buffer minus one (max_dec_pic_buffering_minus1) that corresponds to the maximum decoded picture buffer size, wherein when the dpb_parameters( ) is included in a video parameter set (VPS), output layer sets (OLSs) to which the dpb_parameters( ) applies are specified by the VPS, and wherein when the dpb_parameters( ) is included in a sequence parameter set (SPS), OLSs to which the dpb_parameters( ) applies are specified by the SPS; and decode the current picture based on the ref_pic_list_struct( ) and dpb_parameters( ) to produce a decoded picture.

13. The video coding device of claim 12, wherein the reference picture list syntax structure is referenced according to a list index (listIdx) and a reference picture list structure index (rplsIdx), denoted as ref_pic_list_struct(listIdx, rplsIdx), wherein the number of reference entries is denoted num_ref_entries [listIdx][rplsIdx], and wherein the num_ref_entries [listIdx][rplsIdx] specifies a number of entries in the ref_pic_list_struct(listIdx, rplsIdx).

14. The video coding device of claim 12, wherein a number of pictures in a set of reference pictures (setOfRefPics) referred to in the reference picture list syntax structure is constrained to be less than or equal to the maximum decoded picture buffer size minus one.

15. The video coding device of claim 14, wherein the reference picture list syntax structure includes a reference picture list zero (RefPicList[0]) and a reference picture list one (RefPicList[1]), and wherein the set of reference pictures is a set of unique pictures referred to by all entries in RefPicList[0] that have a same network abstraction layer (NAL) unit header layer identifier (nuh_layer_id) as the current picture and all entries in the RefPicList[1] that have the same nuh_layer_id as the current picture.

16. The video coding device of claim 14, wherein the set of reference pictures is a same set for all slices of each picture.

* * * * *

UNITED STATES PATENT AND TRADEMARK OFFICE
CERTIFICATE OF CORRECTION

PATENT NO. : 12,225,234 B2
APPLICATION NO. : 17/714008
DATED : February 11, 2025
INVENTOR(S) : Ye-Kui Wang Page 1 of 1

It is certified that error appears in the above-identified patent and that said Letters Patent is hereby corrected as shown below:

On the Title Page

Page 3 item (56) References Cited, Other Publications, Second Column:
Delete "Wang, Y.K., "AHGB: Scalability - PTL and decoder capability," Document: JVET-P0117-v1, Joint Video Experts Team (JVET) of ITU-T SG 16 WP 3 and ISO/IEC JTC 1/SC 29/WG 11 16th Meeting: Geneva, CH, Oct.1-11, 2019, 4 pages." and insert -- Wang, Y.K., "AHG8: Scalability - PTL and decoder capability," Document: JVET-P0117-v1, Joint Video Experts Team (JVET) of ITU-T SG 16 WP 3 and ISO/IEC JTC 1/SC 29/WG 11 16th Meeting: Geneva, CH, Oct. 1-11, 2019, 4 pages. --

Page 4 item (56) References Cited, Other Publications, First Column:
Delete "Document: JVET-Q0118-v1, Ye-Kui Want:"AHG8/AHG9: Scalability HLS cleanups."Joint Video Experts Team (JVET) of ITU-T SG 16 WP 3 and ISO/IEC JTC 1/SC 29/WG 11, 17th Meeting: Brussels, BE, Jan. 7-17, 2020, 8 pages." and insert -- Document: JVET-Q0118-v1, Ye-Kui Wang:"AHG8/AHG9: Scalability HLS cleanups."Joint Video Experts Team (JVET) of ITU-T SG 16 WP 3 and ISO/IEC JTC 1/SC 29/WG 11, 17th Meeting: Brussels, BE, Jan. 7-17, 2020, 8 pages. --

Signed and Sealed this
Twenty-fifth Day of March, 2025

Coke Morgan Stewart
*Acting Director of the United States Patent and Trademark Office*